US005970042A

United States Patent [19]

Fujimoto et al.

[11] Patent Number: 5,970,042

[45] Date of Patent: Oct. 19, 1999

[54] RECORDING CARRIER REPRODUCTION/ RECORDING APPARATUS HAVING A REPRODUCTION/RECORDING DEVICE SUPPORTED IN A FLOATING STATE AND A LOCKING MECHANISM FOR CANCELLING THE FLOATING STATE OF THE REPRODUCTION/RECORDING DEVICE

[75] Inventors: Fumihiko Fujimoto; Takeshi Fujii; Tomohisa Koseki, all of Akashi, Japan

[73] Assignee: Fujitsu Ten Limited, Kobe, Japan

[21] Appl. No.: 08/874,861

[22] Filed: Jun. 13, 1997

[30] Foreign Application Priority Data

Jun. 13, 1996 [JP] Japan .................................... 8-175825

[51] Int. Cl.[6] .................................................... G11B 19/04

[52] U.S. Cl. ........................................... 369/247; 369/77.1

[58] Field of Search .................................. 369/77.1–77.2, 369/75.2, 215, 244, 263, 247; 360/98.04, 99.02, 99.03, 99.06, 99.07

[56] References Cited

U.S. PATENT DOCUMENTS

| | | | |
|---|---|---|---|
| 5,123,001 | 6/1992 | Nakamichi et al. | 360/98.04 |
| 5,278,819 | 1/1994 | Shimegi et al. | 360/99.06 |
| 5,481,512 | 1/1996 | Morioka | 369/36 |
| 5,701,290 | 12/1997 | Okada | 369/244 |

FOREIGN PATENT DOCUMENTS 4-362563 12/1992 Japan .

*Primary Examiner*—Brian E. Miller

*Attorney, Agent, or Firm*—Wenderoth, Lind & Ponack, L.L.P.

[57] ABSTRACT

In a vehicular-mount type autochanger apparatus, to avoid influence of external vibration, a chassis is supported in an enclosure in a floating state by a spring of a floating mechanism. A stocker capable of housing a plurality of CDs and a PU unit for playing back a CD are incorporated in the chassis. The PU unit is mounted on a rack which can be elevated and lowered. The rack is also mounted with transport means for transporting a CD that is inserted through an opening of the enclosure to the stocker side or transporting a CD in the opposite direction. A lock pawl can be projected from a rear end portion of the chassis. The lock pawl presses the chassis against the opening side and the floating state being established by the floating mechanism is thereby canceled. Thus, insertion and ejection of a CD can be performed in a reliable manner. As a result, the influence of external vibration can be avoided in performing reproduction or recording on a CD, and a CD can be inserted in a reliable manner.

13 Claims, 44 Drawing Sheets

RECORDING CARRIER REPRODUCTION/RECORDING APPARATUS HAVING A REPRODUCTION/RECORDING DEVICE SUPPORTED IN A FLOATING STATE AND A LOCKING MECHANISM FOR CANCELLING THE FLOATING STATE OF THE REPRODUCTION/RECORDING DEVICE

BACKGROUND OF THE INVENTION

1. Field of the Invention

The present invention relates to an apparatus which performs reproduction and/or recording of a recording carrier such as a compact disc (hereinafter abbreviated as "CD").

2. Description of the Related Art

Conventionally, in vehicular audio equipment and the like, in reproducing a recorded content from a high-density recording carrier or medium such as a CD, a reproduction head is maintained in a floating state by suspending it by a spring to prevent the reproduction and recorded contents from being impaired by external vibration. For example, Japanese Unexamined Patent Publication JP-A 4-362563 (1992) discloses mechanical deck for performing reproduction and/or recording of one of stored optical discs such as CDs. The deck is suspended by a spring with respect to an enclosure to be rendered in a floating state. When an optical disc is unloaded or the apparatus is not in use, the mechanical deck is locked-from both sides in the optical disc inserting/ejecting direction.

FIGS. 50A and 50B show a prior art vehicular autochanger apparatus which is provided in a vehicle compartment and can house a plurality of CDs. FIG. 50A is a simplified front sectional view and FIG. 50B is a simplified top sectional view. A magazine 3 can be inserted into and elected from an enclosure 2 of an autochanger apparatus 1 through an opening that is formed on the front side. The magazine 3 can house a plurality of CDs 4. Information recorded on one of the CDs 4 is optically reproduced with a pickup (hereinafter abbreviated as "PU") unit 5 while the CD is driven, i.e., rotated. Mounted on a rack 6, in the magazine 3 the PU unit 5 can advance toward and retreat from the position of a selected CD 4. The rack 6 is disposed at one side of the enclosure 2 so as not to obstruct insertion and election of the magazine 3 through the front opening of the enclosure 2. In the vehicular autochanger apparatus 1, to prevent external vibration from being exerted on the rack 6, a floating mechanism 7 is provided which renders the rack 6 in a resilient floating state with a spring.

To select one of the CDs 4 housed in the magazine 3 and set the one to the PU unit 5, a space in which the PU unit 5 can be inserted is needed at least on one surface side of each of the housed CDs 4. To select a CD 4 to be played back by inserting the PU unit 5 into the magazine 3, the entire magazine 3 needs to be elevated or lowered so that the intended CD 4 is at the same height as the PU unit 5. Further, where a space in which the PU unit 5 can be inserted is provided for every one of the plurality of CDs 4 housed in the magazine 3, the CD housing capacity decreases in number if the thickness of the magazine 3 is limited. In view of this, the magazine 3 is made dividable in the vertical direction, so that a space can be formed on only one side of a CD 4 to be played back with the PU unit 5. To effect such elevation/lowering and division of the magazine 3, an elevation/lowering and dividing mechanism 8 is provided at a side of the enclosure 2. An electronic circuit board 9 for processing information reproduced with the PU unit 5 and controlling the respective mechanisms of the autochanger apparatus 1 is disposed at a rear position of the chassis 2.

In an apparatus in which a CD 4 is inserted individually and then played back without providing a magazine 3 or the like as in the case of JP-A 4-362563, to insert a CD 4 from the outside and set it reliably so that it is opposed to the PC unit 5 in a floating state, a complex transport means is needed which can transfer the CD 4 from an insertion opening to the position opposed to the PC unit 5 in a floating state.

SUMMARY OF THE INVENTION

An object of the present invention is to provide a recording carrier reproduction/recording apparatus in which a floating state is established for protection from external vibration or the like while a recording carrier is subjected to reproduction or recording, and when a recording carrier is inserted a floating state is canceled to facilitate the insertion of the recording carrier.

The invention provides a recording carrier reproduction/recording apparatus which incorporates, in an enclosure, reproduction/recording means for performing reproduction/recording of a recording carrier inserted into the enclosure from outside. The apparatus includes spring means for supporting the reproduction/recording means so that the reproduction/recording means is in a floating state with the enclosure.

A lock means is provided for canceling the floating state to insert or eject the recording carrier by pressing the reproduction/recording means against a wall around an opening by causing a pressing member which projects from the reproduction/recording means at a side opposite to the opening to touch a wall of the enclosure.

In the above recording carrier reproduction/recording apparatus, the reproduction/recording means for performing reproduction and/or recording on a recording carrier is supported in the enclosure in a floating state by means of the spring means. When a recording carrier to be subjected to reproduction or recording by the reproduction/recording means is inserted or ejected through the opening of the enclosure, the lock means causes the pressing member to project at the side opposite to the opening and thereby touch the wall of the enclosure. Since the reproduction/recording means is pressed against the wall around the opening in the enclosure and the floating state is thereby canceled, the recording carrier can be inserted into or ejected from the reproduction/recording means through the opening in a reliable manner. Further, since the reproduction/recording means is pressed against the wall around the opening in the enclosure, no gap is formed between the enclosure and the reproduction/recording means, which also contribute reliable insertion of the recording carrier into the reproduction/recording means and its reliable ejection from the opening.

The invention provides a recording carrier reproduction/recording apparatus which incorporates, in an enclosure, a mechanical deck mounted with housing means capable of housing a plurality of recording carriers and reproduction/recording means for performing reproduction and/or recording on a recording carrier, comprising an enclosure formed with an opening through which a recording carrier is inserted or ejected individually; spring means for supporting the mechanical deck in the enclosure in a floating state; and lock means for canceling the floating state to insert or eject a recording carrier by pressing the mechanical deck against a wall around an opening by causing a pressing member that projects from the mechanical deck at a side opposite to the opening to touch a wall of the enclosure.

In the above recording carrier reproduction/recording apparatus, the housing means capable of housing a plurality of recording carriers and the reproduction/recording means for performing reproduction and/or recording on a recording carrier are mounted on the mechanical deck. Since the mechanical deck is incorporated in the enclosure and supported in a floating state by the spring means, superior reproduction and/or recording can be performed without being affected by external vibration or the like. In inserting or ejecting a recording carrier, a reliable operation can be secured by canceling the floating state.

The apparatus of the invention may comprise shutter means which is opened or closed in link motion with the lock means, for enabling insertion or ejection of a recording carrier through the opening after cancellation of the floating state by the lock means.

With this configuration, by virtue of the shutter means for enabling insertion or ejection of a recording carrier after cancellation of the floating state in link motion with the lock means, a recording carrier cannot be inserted into or ejected from the enclosure when the reproduction/recording means in the floating state. Therefore, it can be prevented that a recording carrier or the inside of the apparatus is damaged due an erroneous manipulation.

In the invention the lock means may include a pressing member which projects sideways from the reproduction/recording means or the mechanical deck when a recording carrier is inserted or ejected.

With this configuration, the lock means can cancel the floating state by projecting the pressing member also sideways from the reproduction/recording means or the mechanical deck and making it to touch a wall of the enclosure.

In the invention, the lock means may comprise common cam means for an operation of causing the respective pressing means to project.

With this configuration, since the operations of causing the respective pressing means to project by the lock means is effected by using the common cam means, an adjustment of the link motion of the respective pressing means, for instance, can be conducted easily by adjusting a cam shape.

The invention is characterized in that a rod-like member is provided which projects sideways from the reproduction/recording means or the mechanical deck and has a minimum-diameter portion between tip and proximal ends thereof, and in a side wall of the enclosure is formed a groove in which the rod-like member is inserted and whose width varies so that the minimum-diameter portion of the rod-like member is guided when the rod-like member is moved in inserting or ejecting a recording carrier.

With this configuration, the rod-like member which projects sideways from the reproduction/recording means or the mechanical deck has the minimum-diameter portion between its tip and proximal end. As the reproduction/recording means or the mechanical deck moves to cancel the floating state, the minimum-diameter portion is guided to a narrow portion of the groove formed in the wall of the enclosure. Thus, alignment of the reproduction/recording means or the mechanical deck can be effected.

In the invention, the rod-like member may move in link motion with the lock means in inserting or ejecting a recording carrier.

With this configuration, since the lock means moves the rod-like member in inserting or ejecting a recording carrier, the alignment action by means of the groove formed on the enclosure side can be performed more reliably.

In the invention, the apparatus may further comprise moving means for selecting one from among recording carriers housed in the housing means and moving the selected recording carrier so that the selected recording carrier is subjected to reproduction or recording; and driving means for driving the moving means and the lock means in a switched manner.

With this configuration, the moving means for selecting a recording carrier housed in the housing means is provided. The driving of the moving means and the driving of the lock means are performed in a switched manner by the common driving means. The operation of the lock means is needed when a recording carrier is inserted from or ejected to the outside of the enclosure, and during this operation the movement by the moving means is not effected. By sharing the driving means, with respect to the apparatus as a whole efficient operations and downsizing can be achieved.

As described above, according to the invention, since the reproduction/recording means can be pressed against the opening side of the enclosure by the lock means in inserting or ejecting a recording carrier, the recording carrier can be inserted into the reproduction/recording means or ejected from the opening in a reliable manner. Since the reproduction/recording means is supported in the enclosure in a floating state by means of the spring means during reproduction or recording on a recording carrier, influence of vibration outside the enclosure can be reduced to ensure reliable reproduction and/or recording.

According to the invention, the mechanical deck can be supported in a floating state by the spring means when reproduction or recording is performed on a recording carrier. The mechanical deck can be pressed against the opening side of the enclosure by the lock means when a recording carrier is inserted or ejected.

According to the invention, since the shutter means is provided adjacent to the opening of the enclosure, insertion or ejection of a recording carrier can be performed only after cancellation of the floating state by the lock means. Therefore, problems can be avoided that would otherwise caused by inserting or ejecting a recording carrier when the reproduction/recording means or the mechanical deck is in a floating state.

According to the invention, pressing is effected also sideways by means of the pressing means which projects sideways from the reproduction/recording means or the mechanical deck, when a recording carrier is inserted or ejected. Therefore, the floating state can be canceled more reliably.

According to the invention, since the lock means causes the respective pressing means to project by using the common cam means, an adjustment of the operations of the pressing means can easily be performed by adjusting a cam shape, for instance.

According to the invention, the rod-like member having the minimum-diameter portion between its tip and proximal end projects sideways from the reproduction/recording means or the mechanical deck, and is guided in the groove formed in the side wall of the enclosure. During reproduction or recording, the minimum-diameter portion of the rod-like member is guided to the groove, whereby the displacement of the rod-like member in its axial direction is restricted.

According to the invention, since the rod-like member is moved by the lock means, alignment which depends on a difference in diameter can be performed in a reliable manner.

Further, according to the invention, the movement for selecting a recording carrier housed in the housing means and the operation of canceling the floating state of the reproduction/recording means or the mechanical deck to insert or eject a recording carrier from or to the outside of the enclosure can be performed in a switched manner by using the common drive source. The above movement and operation are not performed simultaneously. By sharing the drive source, the apparatus as a whole can perform efficient operations and can be made smaller by reducing the spaces needed.

BRIEF DESCRIPTION OF THE DRAWINGS

Other and further objects, features, and advantages of the invention will be more explicit from the following detailed description taken with reference to the drawings in which.

DETAILED DESCRIPTION OF THE PREFERRED EMBODIMENT

Figure 1:
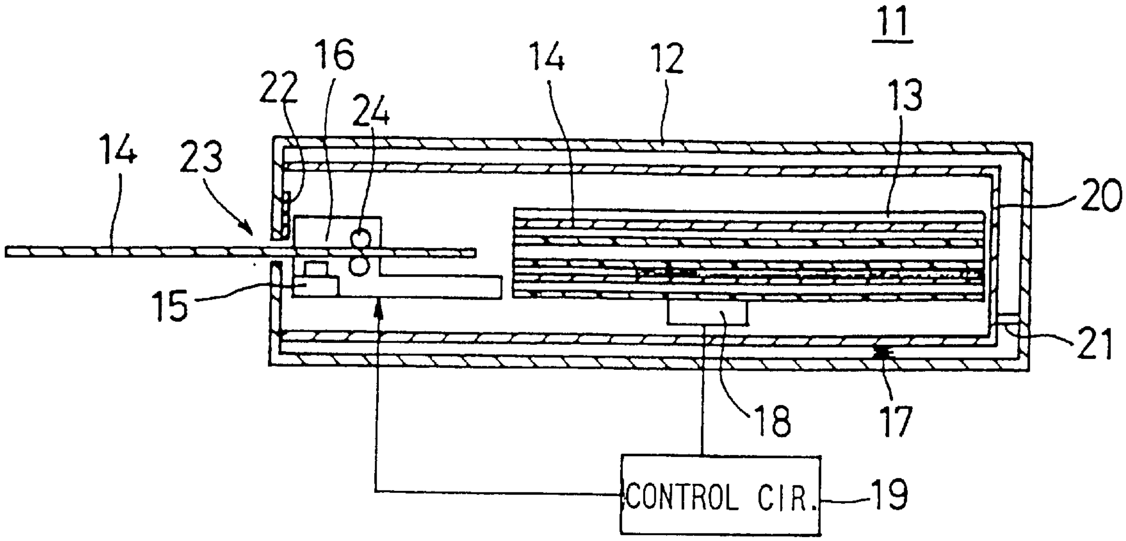
FIG. 1 is a block diagram showing the entire configuration of an autochanger apparatus according to an embodiment of the invention.

Now referring to the drawings, preferred embodiments of the invention are described below.

FIG. 1 shows a general configuration of a vehicular autochanger apparatus 11 according to an embodiment of the invention. An enclosure 12 is generally of a rectangular parallelepiped shape with given dimensions of the "1DIN size," for instance. The enclosure 12 incorporates a stocker 13 (housing means), which can house a plurality of, for instance, six, CDs 14. A CD 14, which is a disc-shaped recording carrier, can be inserted and ejected individually. CDs 14 housed in the stocker 13 can optically be played back individually with a PU unit 15. The PU unit 15 has an optical pickup and is mounted on a rack 16 (moving means). Where the recording carriers are recordable ones such as MDs, the PU unit 15 should be a recordable one. To reduce the influence of external vibration, such internal mechanisms as the rack 16 and the stocker 13 incorporated in the enclosure 12 are resiliently supported by a floating mechanism 17 (spring means). An elevation/lowering and dividing mechanism 18 can not only elevate/lower the entire stocker 13 but it can also separate and then elevate/lower only a part of the stocker 13 that is above the housing position of a particular CD 14. The operations of the PU unit 15 (reproduction/recording means), the rack 16, and the elevation/lowering mechanism 18 are controlled by a control circuit 19 (control means). The control circuit 19 is disposed at one side of the enclosure 12. The floating mechanism 17 suspends a chassis 20 which incorporates a mechanical deck including the rack 16 and the stocker 13 in a floating state with respect to the enclosure 12. When a CD 14 is inserted or ejected, a lock pawl 21, which is a pressing member of a lock means, fixes the chassis 20 to the enclosure 12 such that the lock pawl 21 pushes the rear wall of the enclosure 12 and its reaction force presses the chassis 20 against the front wall of the enclosure 12. A shutter 22 (shutter means), which is disposed at a front side of the rack 16, can open and close an opening 23 of the enclosure 12. Transport rollers 24 (transport means) are also mounted on the rack 16.

Figure 2:
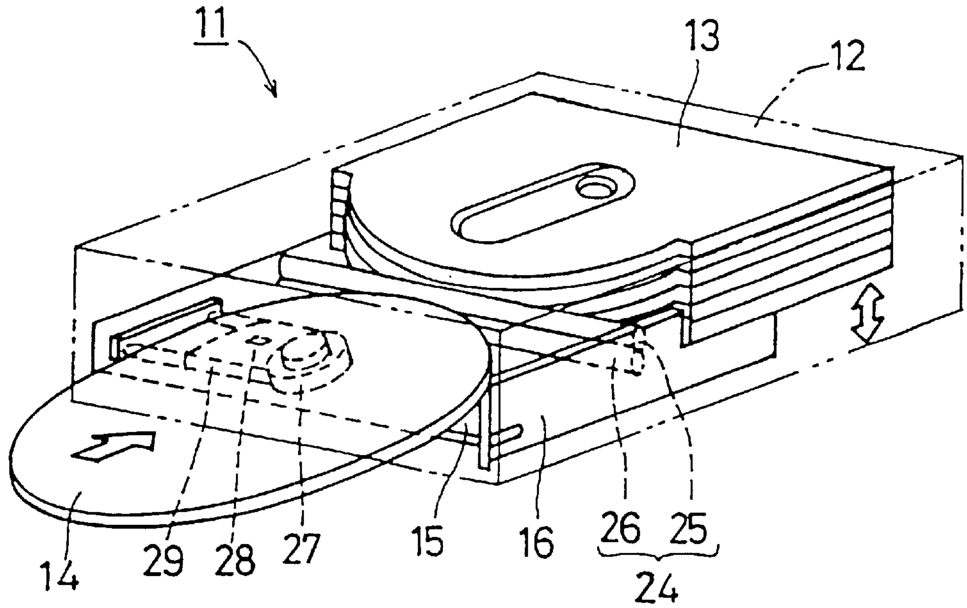
FIG. 2 is a perspective view illustrating a disc loading operation of the autochanger apparatus of FIG. 1.
Figure 3:
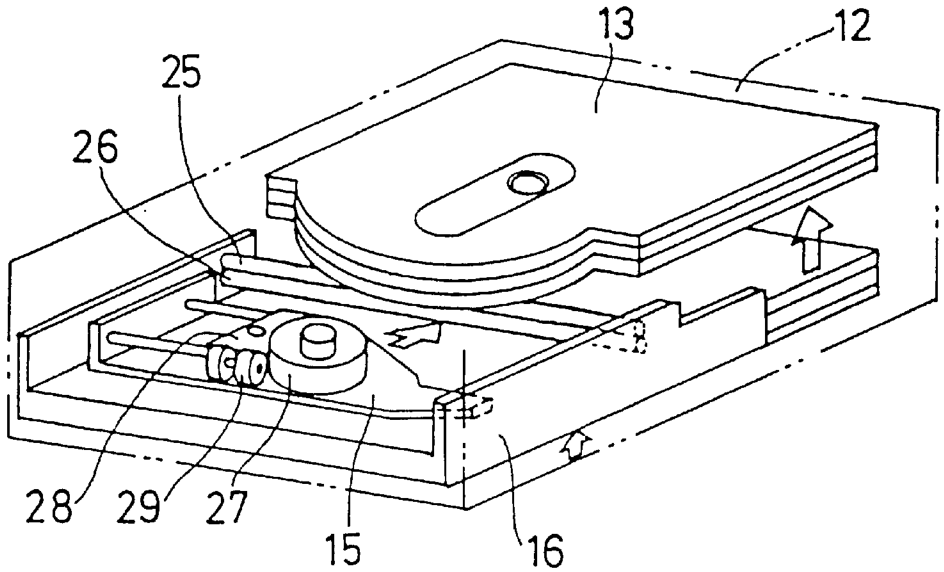
FIG. 3 is a perspective view illustrating a pickup unit loading operation of the autochanger apparatus of FIG. 1.
Figure 4:
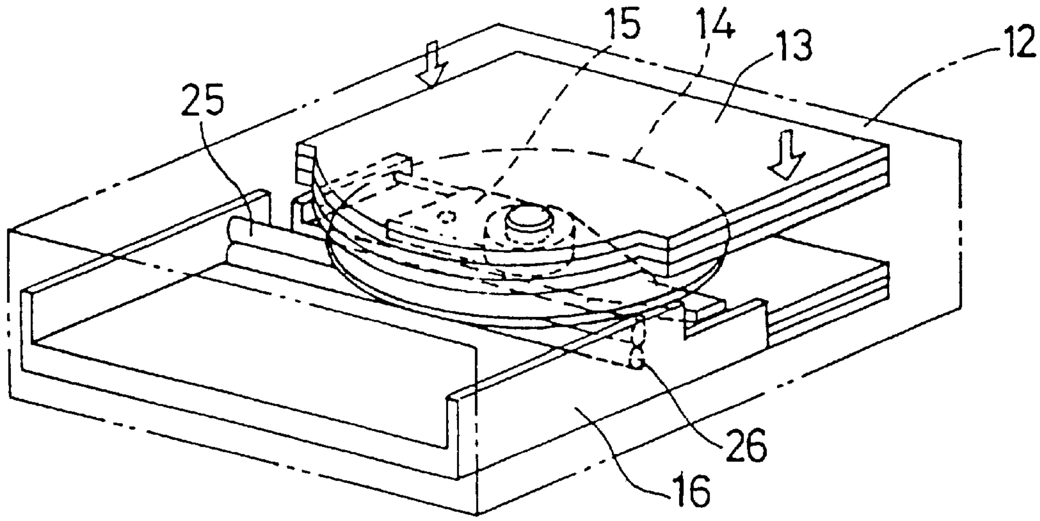
FIG. 4 is a perspective view illustrating a disc clamping operation of the autochanger apparatus of FIG. 1.
Figure 5:
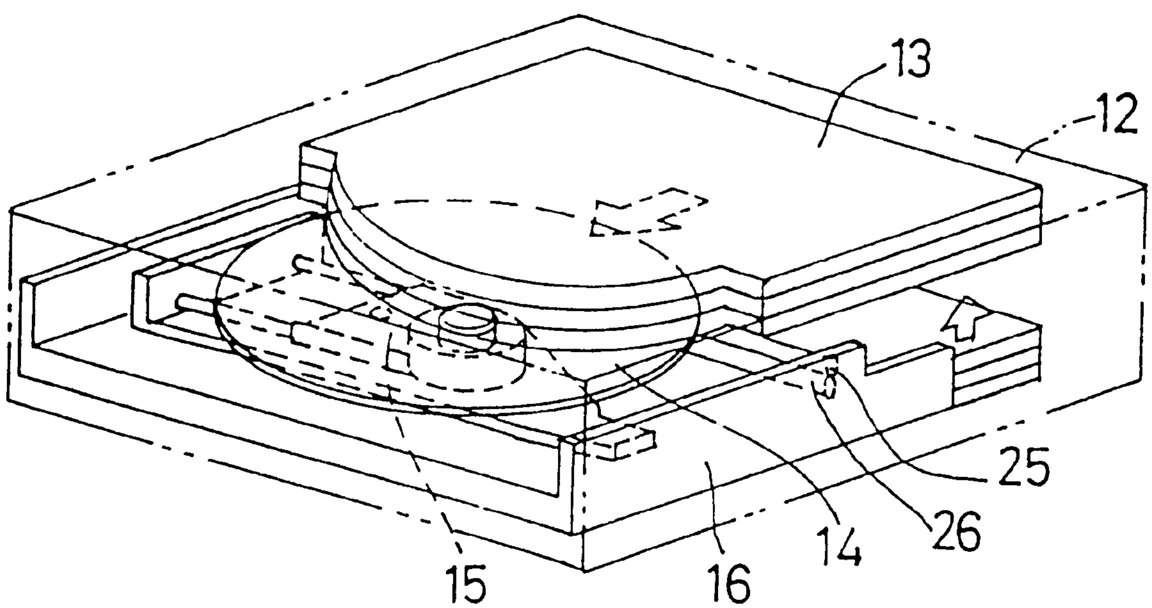
FIG. 5 is a perspective view illustrating a playback operation of the autochanger apparatus of FIG. 1.

FIGS. 2–5 illustrate operations from insertion of a CD 14 into the autochanger apparatus 11 of FIG. 1 to its playback. FIG. 2 illustrates a disc loading operation in which a CD 14 is inserted through the opening of the enclosure 12 and then moved to one of the holding positions of the stocker 13 while being held between the transport rollers 24, i.e., top and bottom rollers 25 and 26. The PU unit 15 includes a turn table 27 for driving, i.e., rotating, the CD 14, a PU 28 for reproducing information recorded on the CD 14, and a tracking mechanism 29 for moving the PU 28 in the radial direction of the CD 14. FIG. 3 illustrates a PU unit loading operation in which a part of the stocker 13 above a specified holding position is separated and elevated, then the rack 16 is elevated to have the PU unit 15 located at the height of the specified holding position, and finally the PU unit 15 is advanced into a space formed by the elevation of the separated part of the stocker 13. FIG. 4 illustrates a disc clamping operation in which the separated part of the stocker 13 which holds the CD 14 is lowered and the CD 14 is clamped and fixed to a rotary shaft of the PU unit 15. FIG. 5 illustrates a playback operation in which after the PU unit 15 retreats and the holding state by the stocker 13 is canceled, the separated part of the stocker 13 is again elevated and then the CD 14 is played back with the PU unit 15.

Figure 6:
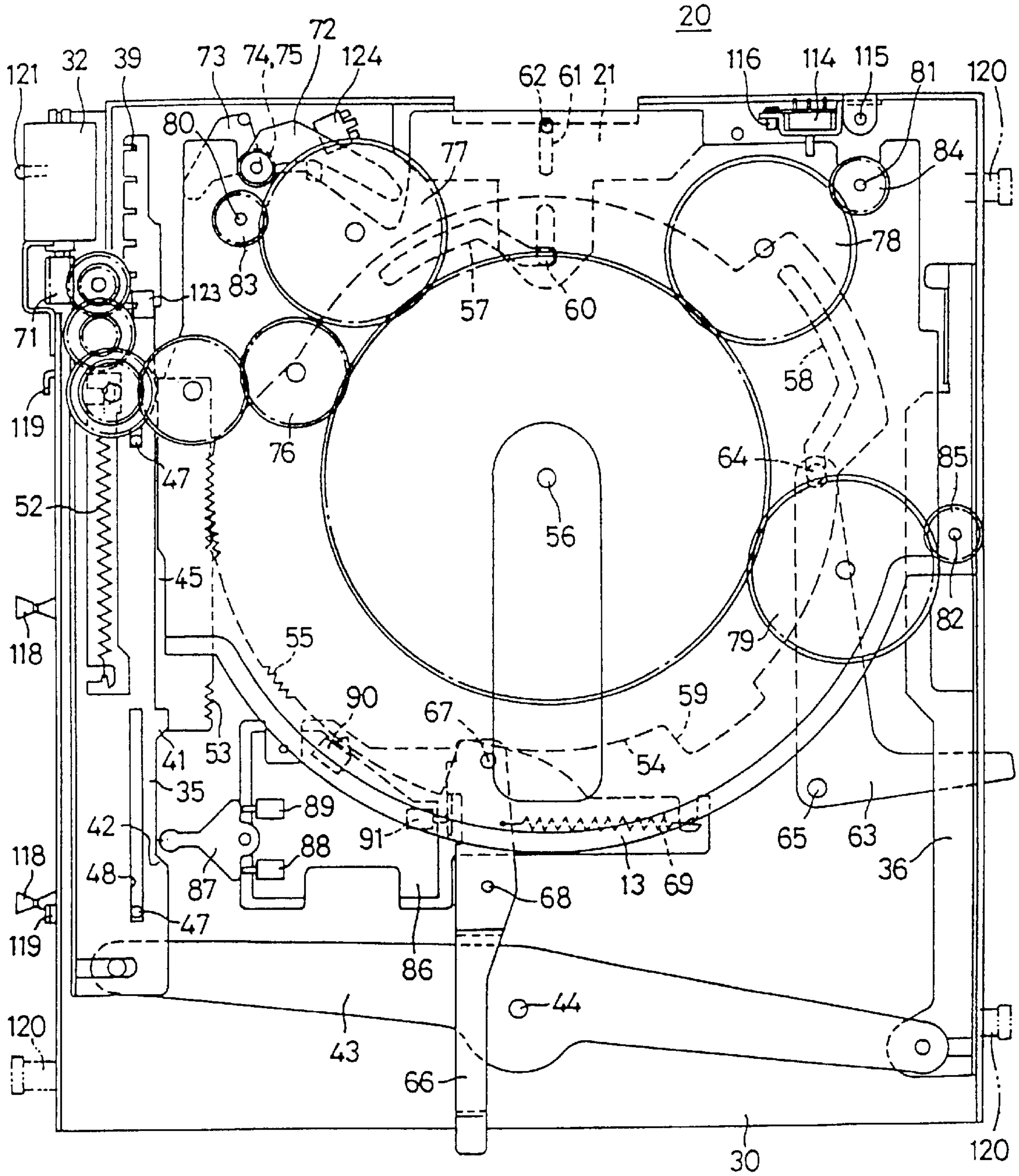
FIG. 6 is a plan view of a chassis of the autochanger apparatus of FIG. 1.
Figure 7:
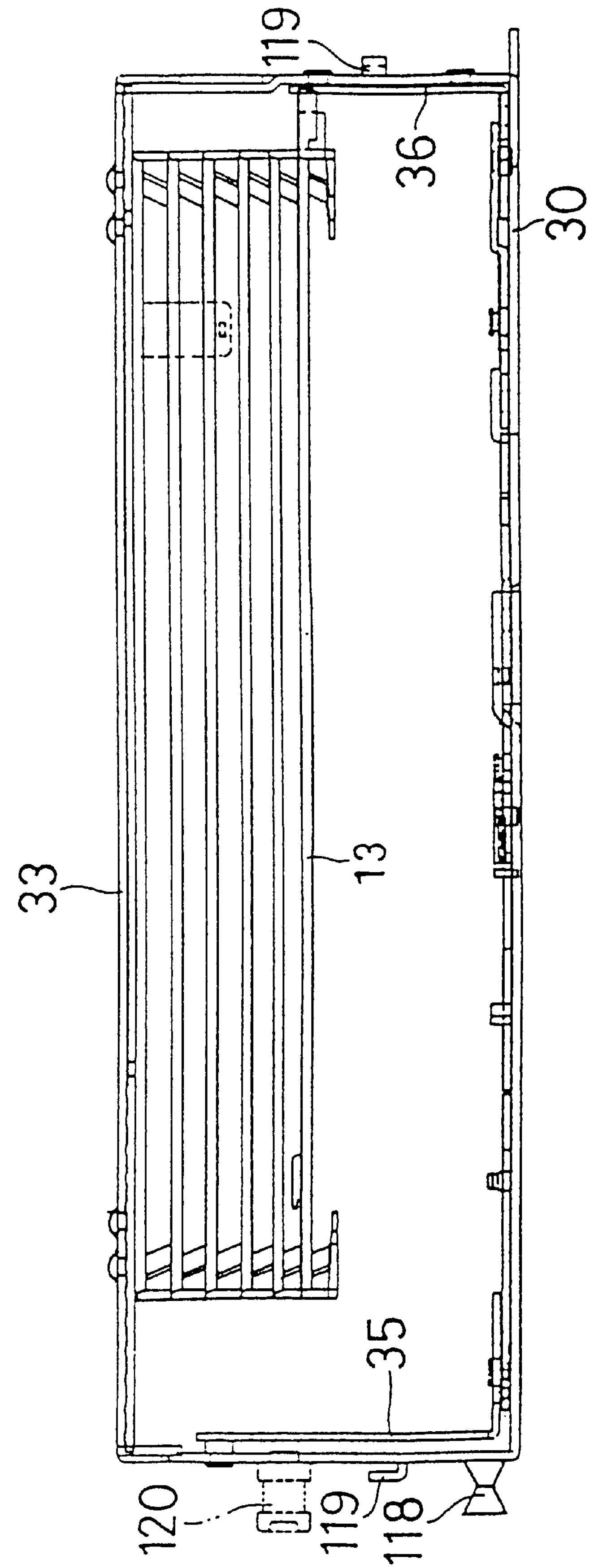
FIG. 7 is a front view of the chassis shown in FIG. 1.
Figure 8:
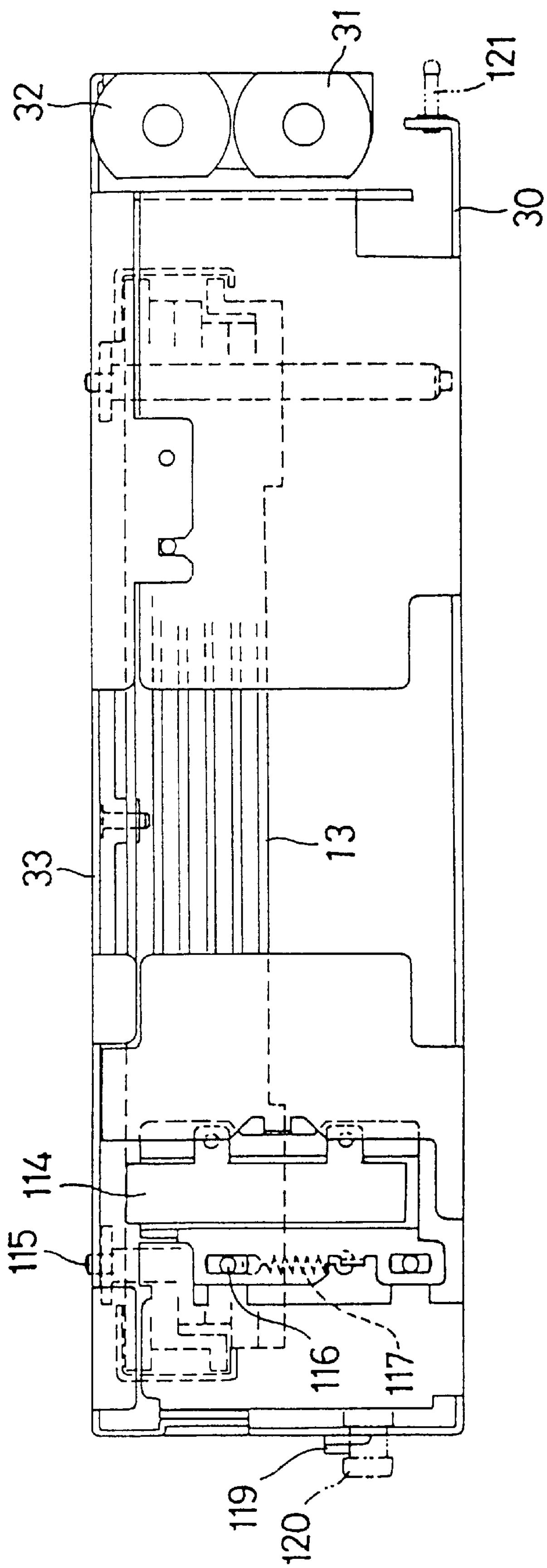
FIG. 8 is a rear view of the chassis shown in FIG. 1.
Figure 9:
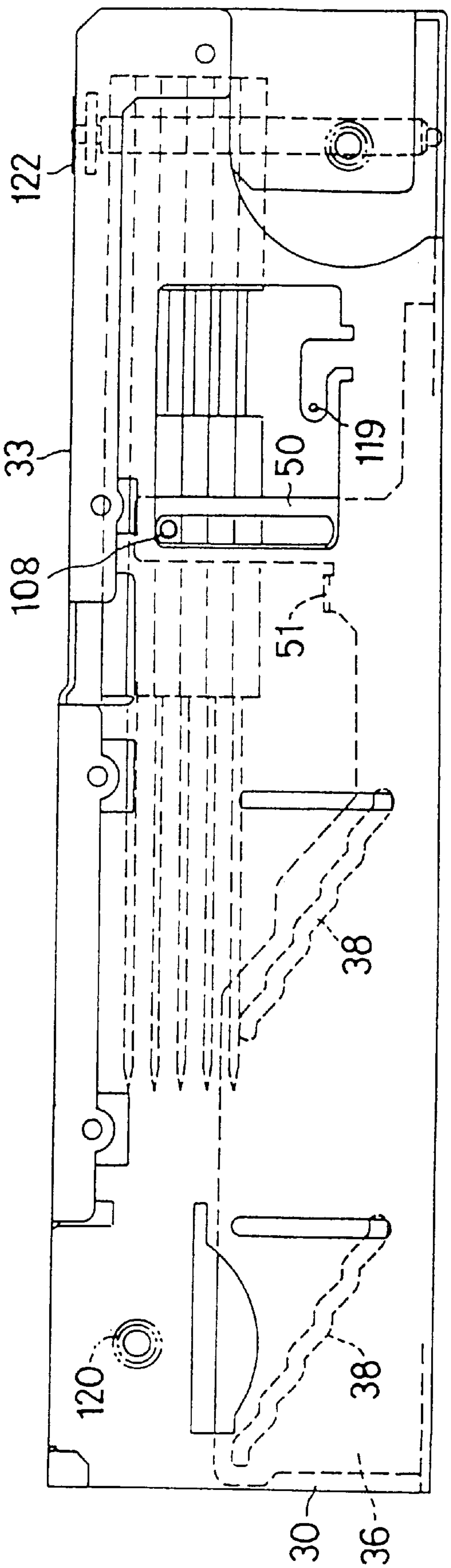
FIG. 9 is a right-hand side view of the chassis shown in FIG. 1.
Figure 10:
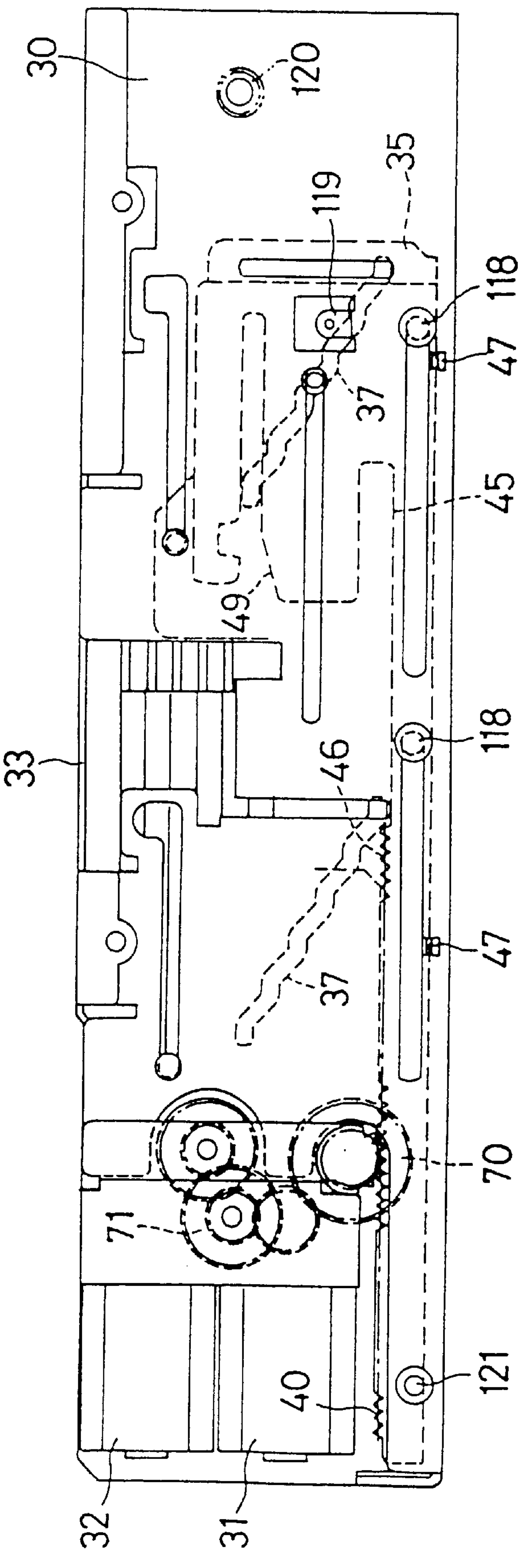
FIG. 10 is a left-hand side view of the chassis shown in FIG. 1.
Figure 11:
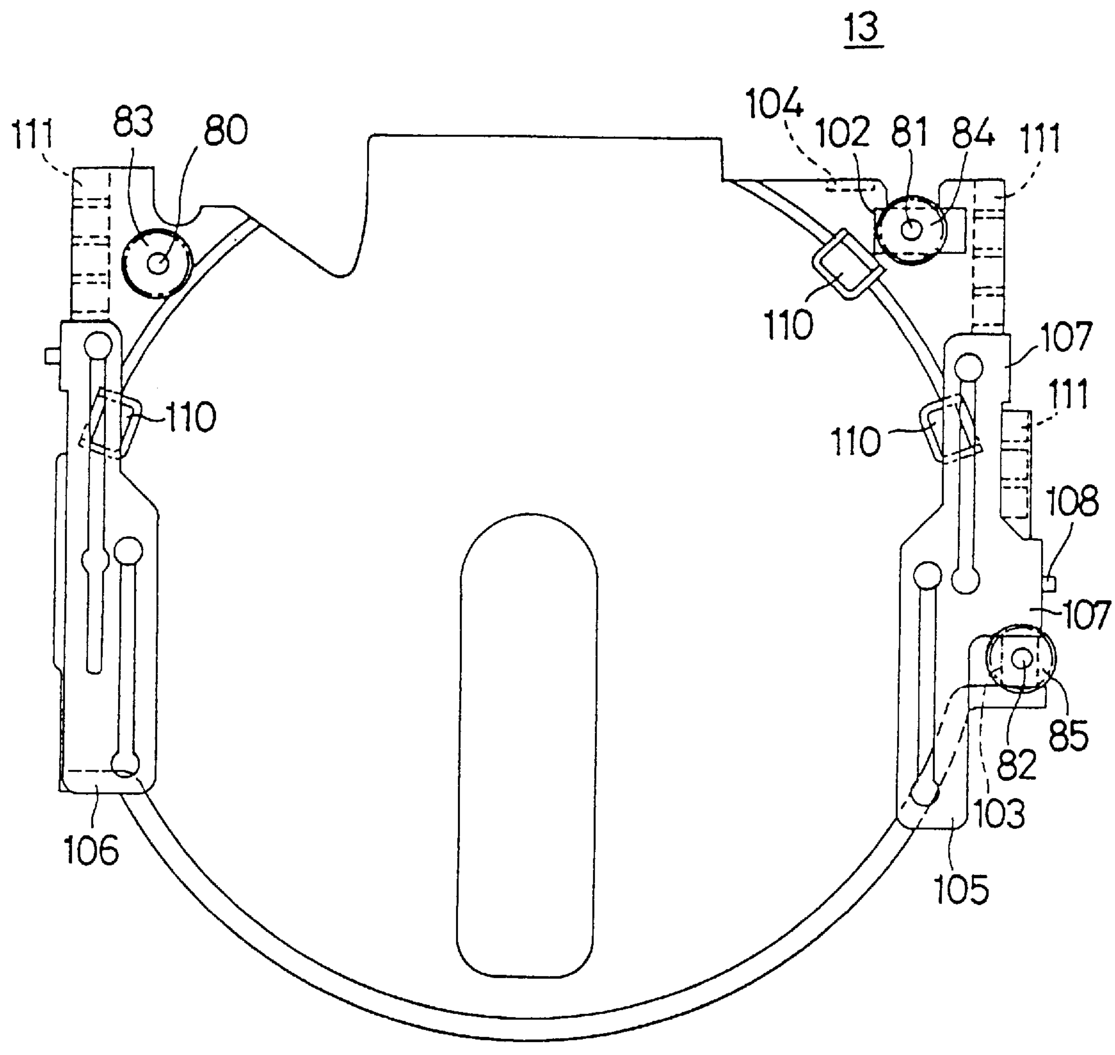
FIG. 11 is a plan view of a stocker shown in FIG. 1.
Figure 12:
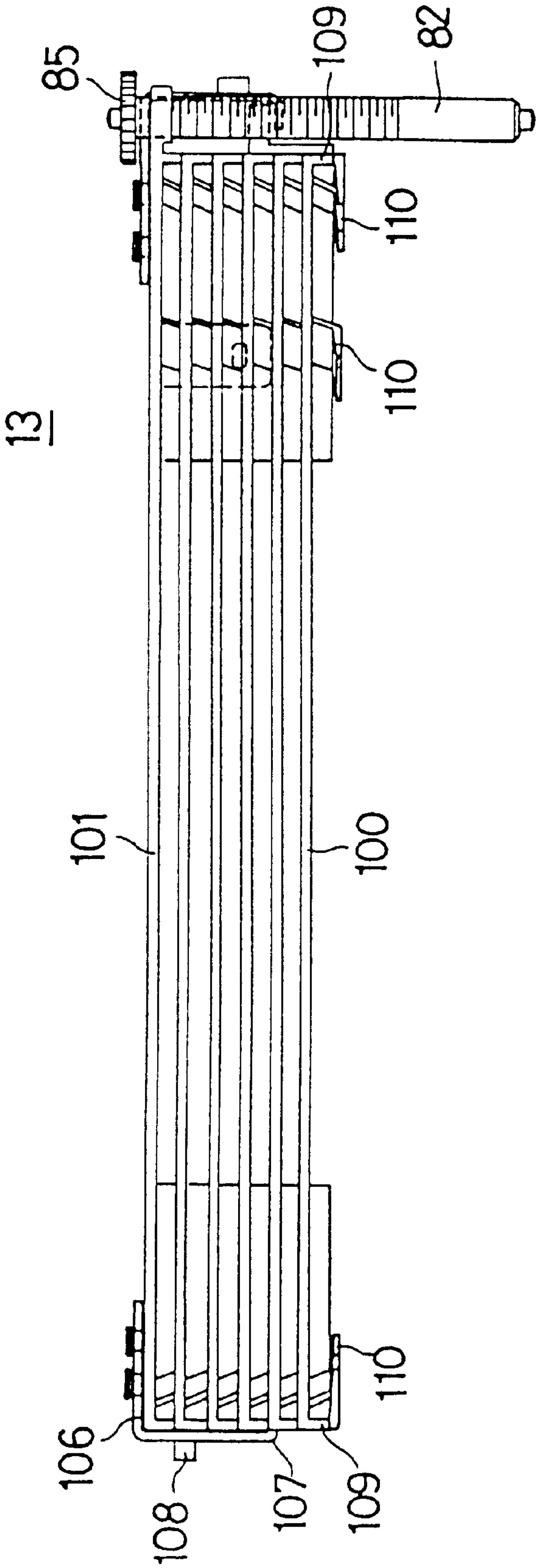
FIG. 12 is a front view of the stocker shown in FIG. 1.
Figure 13:
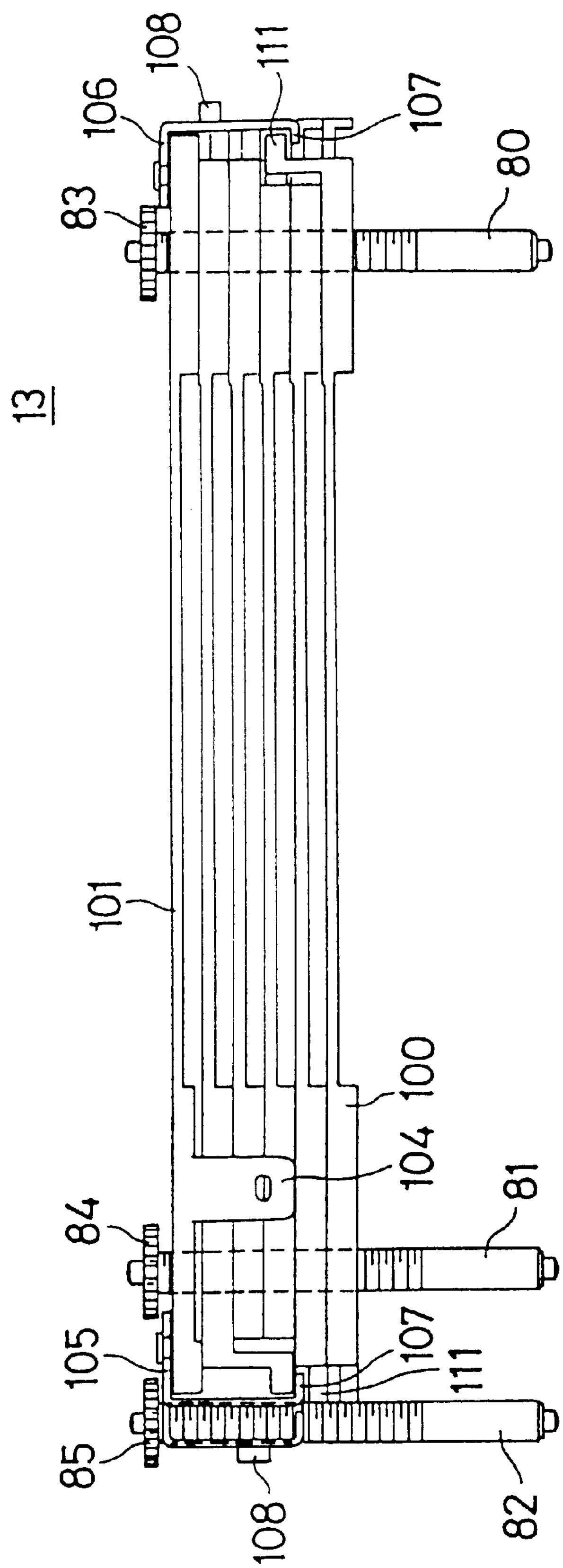
FIG. 13 is a rear view of the stocker shown in FIG. 1.
Figure 14:
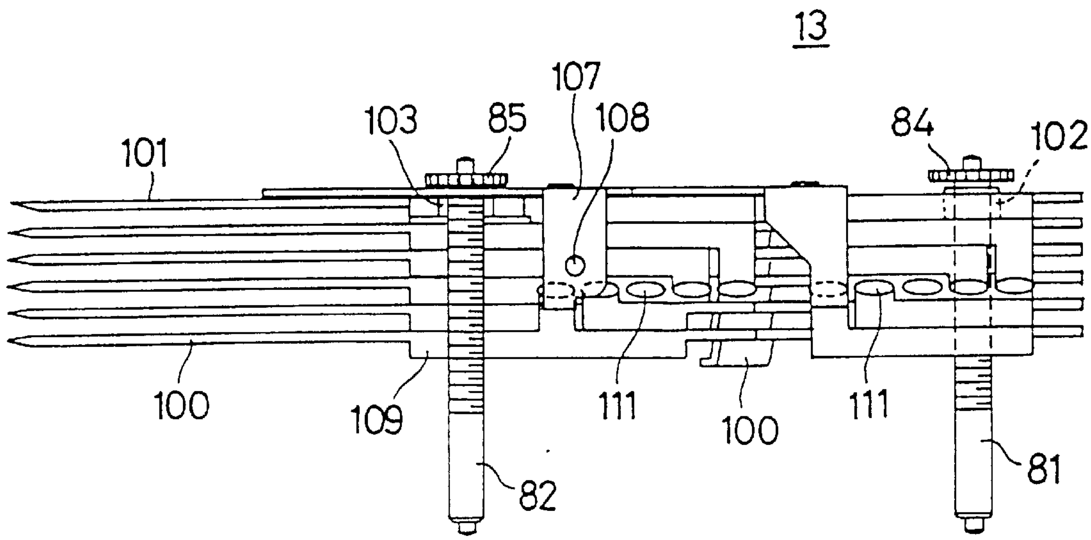
FIG. 14 is a right-hand side view of the stocker shown in FIG. 1.
Figure 15:
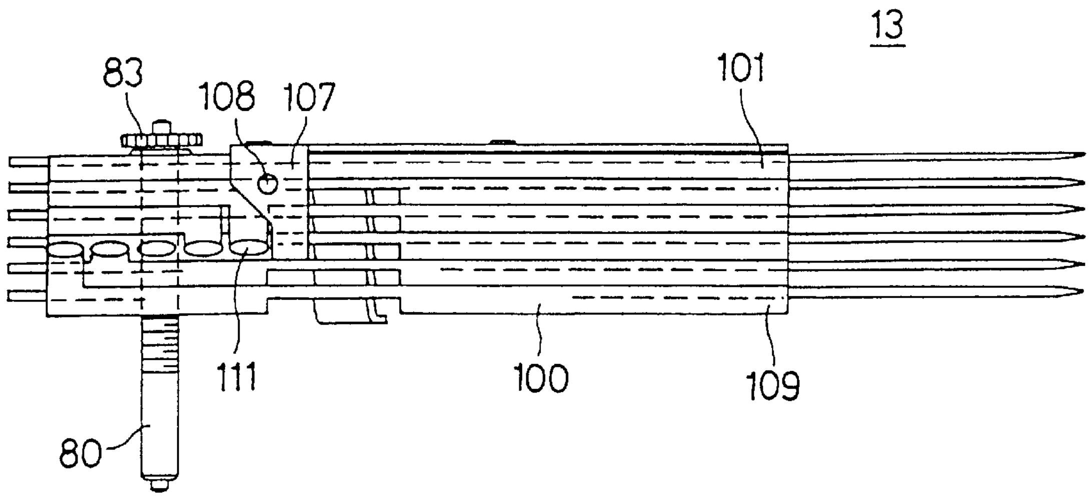
FIG. 15 is a left-hand side view of the stocker shown in FIG. 1.

FIGS. 6–10 show configurations relating to the chassis 20 of the autochanger apparatus 11. FIG. 6 is a plan view, FIG. 7 is a front view, FIG. 8 is a rear view, FIG. 9 is a right-hand side view, and FIG. 10 is a left-hand side view. A stairs motor 31 (driving means) and a stocker motor 32 are mounted on a rear portion of a left side wall of a base 30 at lower and upper positions, respectively. A top portion of the base 30 is covered with a cover 33.

Stairs sliding members 35 and 36 are provided at left and right sides, respectively, of the base 30. Formed with stairs grooves 37 and 38, respectively, the stairs sliding members 35 and 36 can elevate/lower the rack in six stages through their horizontal movement. The left-hand stairs sliding member 35 is formed with slits 39 to allow the position of the rack 16 to be detected optically. The left-hand stairs sliding member 35 is provided with a stairs rack 40 at its rear top position for driving in the front-rear direction. Also, the sliding member 35 is formed with a stair upper limit touching portion 41 and a stair origin touching portion 42 at its front inside positions. The left-hand stairs sliding member 35 and the right-hand stairs sliding member 36 are connected to each other by a transmission lever 43 which is provided at a front position of the base 30. A central shaft 44 is provided at the center of the transmission lever 43, and the transmission lever 43 is swingable about the central shaft 44. Since the left-hand stairs sliding member 35 and the right-hand stairs sliding member 36 are connected to each other by the transmission lever 43, they move in opposite directions. Therefore, the stairs grooves 38 formed in the right-hand stairs sliding member 36 and the stairs grooves 37 formed in the left-hand stairs sliding member 35 move in opposite directions.

A lock sliding member 45 is provided between the left-hand stairs sliding member 35 and the base 30. A lock rack 46 is formed in a rear-top portion of the lock sliding member 45. Link pins 47, which are mounted on the lock sliding member 45, are inserted in link elongated holes 48. The link pins 47 can freely move in the link elongated hole 48 in a range in which the stairs sliding member 35 elevates/lowers the rack 16 between the positions of the second and sixth stages. When the stairs sliding member 35 is to lower the rack 16 to the first-stage position, the link pins 47 touch the front ends of the link elongated holes 48 and move together with the lock sliding member 45 to the rear side. A transport switching cam 49, which is to effect switching as to whether to connect a mechanism for advancing/retreating the PU unit 15 mounted on the rack 16 to a mechanism for driving the transport rollers 24, is formed at a central position of the lock sliding member 45. Each of the stairs sliding members 35 and 36 is formed, in the rear portion thereof, with a stocker guide 50 and a stocker stopper 51, which are used for elevating/lowering and dividing of the stocker 13 (described later). The left-hand stairs sliding member 35 and the lock sliding member 45 are pulled toward each other by a spring 52, such that the link pins 47 are urged into engagement with the front ends of the link elongated holes 48.

An inner portion of the lock sliding member 45 is formed a transmission rack 53, which meshes with teeth 55 formed in part of the outer periphery of a cam member 54 which is mounted on the base 30 at its rear central position. The cam member 54 is generally circular and is capable of angular displacement about a central shaft 56. A rear lock cam groove 57, a side lock cam groove 58, and a shutter touching portion 59 are formed in a relatively rear portion, a relatively right-hand portion, and a relatively front portion, respectively, of the cam member 54 which is a common cam means. A follower 60 of the lock pawl 21 is inserted in the rear lock cam groove 57. The lock pawl 21 is formed, at its central position, with an elongated hole 61 extending in the front-rear direction, and a pin 62 extending from the base 30 engages the elongated hole 61. When the rear lock cam groove 57 pushes the follower 60 to the rear side as the cam member 54 makes angular displacement, the lock pawl 21 is pushed toward the rear side and in turn the rear end of the lock pawl pushes the enclosure 12 so that the chassis 20 moves away from the rear end of the enclosure 12. In this manner, the front end of the chassis 20 can be pressed against the front side of the enclosure 12. A follower 64 which is mounted on a side lock lever 63 at its proximal end position engages the side lock cam groove 58. The side lock lever 63 is generally L-shaped, and a pin 65 erected from the base 30 is inserted in a through-hole that is formed in a bent portion of the side lock lever 63. Thus, the side lock lever 63 is swingable about the pin 65. A tip portion (pressing member) of the side lock lever 63 projects rightward from the base 30, and can pushes the enclosure 12 so that the base 30 moves away from the right side wall of the enclosure 12. The shutter touching portion 59 pushes sideways a pin 67 which is mounted on a shutter transmission lever 66 at its proximal end position. Thus, the shutter touching portion 59 can cause the shutter transmission lever 66 to angularly displace about a swing shaft 68, which swingably supports the shutter transmission lever 66. The shutter transmission lever 66 is urged by a spring 69 in a direction of closing the shutter 22.

Rotational outputs of the stairs motor 31 and the stocker motor 32 are transmitted via gear trains 70 and 71, respectively. A push-out lever 72, which is provided at a rear end position of the base 30 relatively close to its left side wall, can push out a CD 14 held in the stocker 13 (in a holding state). A transmission lever 73 is provided under the push-out lever 72, and a rear end portion of the lock sliding member 45 can touch the transmission lever 73. In a state that the lock sliding member 45 is fully retreated or withdrawn, the tip of the push-out lever 72 pushes out a CD 14 held in the stocker 13 through the transmission lever 73. A spring 74 is provided between the push-out lever 72 and the transmission lever 73, and a spring 75 is provided between the transmission lever 73 and the base 30. Between the push-out lever 72 and the transmission lever 73, the push-out lever 72 is urged by the spring 74 in the direction in which its tip is pushed out. The transmission lever 73 is urged by the spring 75 so that its portion touching the rear end of the lock sliding member 45 is advanced.

A gear train 76 is provided to transmit rotational drive force that is transmitted from the stairs motor 31 via the gear train 71. The gear train 76 is attached to the inside surface of the cover 33. Spur gears 77 and 78, which mesh with the gear train 76, are attached to the top surface of the cover 33, and can be inserted after assembling of the gear train 76. A spur gear 79, which is similar to the spur gears 77 and 78, is attached to the bottom surface of the cover 33. The spur gears 77–79 mesh with spur gears 83–85 mounted on top portions of the feed screws 80–82, respectively, which are provided in the stocker 13.

A switch (hereinafter abbreviated as "SW" in some cases) board 86 is mounted in a proximity of the cam member 54 at a front or forward position of the base 30. A proximal end portion of a stair upper/lower limit lever 87 is mounted on a left portion of the switch board 86. A tip portion of the stair upper/lower limit lever 87 can touch the stair upper limit touching portion 41 and the stair origin touching portion 42 of the stairs sliding member 35. When the tip of the stair upper/lower limit lever 87 touches the stair upper limit touching portion 41, a stair upper limit SW 88 on the proximal end portion side of the stair upper/lower limit lever 87 is turned on. When the stairs sliding member 35 retreats and the stair origin touching portion 42 thereby touches a tip portion of the stair upper/lower limit lever 87, the proximal end portion of the stair upper/lower limit lever 87 turns on a stair origin SW 89.

A lock position SW 90 is also mounted on the switch board 86. The lock position SW 90 turns on when pushed by a circumferential portion of the cam member 54 that is adjacent to the teeth 55 formed in the outer peripheral portion, and turns off when the circumferential portion terminates. When the cam member 54 angularly displaces and is thereby locked by the lock pawl 21 or the side lock lever 63, the lock position SW 90 is rendered in an off-state. An insertion/ejection position SW 91 is also mounted on the base 30. The insertion/ejection position SW 91 is turned on by the shutter transmission lever 66 at a position where the rack 16 comes to have the same height as the opening 23 and a CD 14 is to be inserted or ejected by the transport rollers 24.

FIGS. 11–15 are a plan view, a front view, a rear view, a right-hand side view, and a left-hand side view, respectively, of the stocker 13 in an assembled state. In this embodiment, the stocker 13 is capable of housing CDs 14 in six stages which are formed by stocker members 100 of five stages and an uppermost stocker member 101. The feed screws 80–82 are screwed and threadedly engaged with or coupled with the uppermost stocker 101 at two rear positions and one right-hand position. The feed screw 80 at the rear-left position is screwed and threadedly engaged with the uppermost stocker member 101 directly. The other feed screws 81 and 82 are coupled with the uppermost stocker member 101 through elevation/lowering members 102 and 103, respectively. The elevation/lowering members 102 and 103 are formed with female screws which are screwed and engaged with the feed screws 81 and 82 so that the elevation/lowering members 102 and 103 can move the uppermost stocker member 101 vertically. Since the female screws are formed so that the elevation/lowering members 102 and 103 can move the uppermost stocker member 101, an adjustment or the like of the meshing states between the spur gears 83–85 and the spur gears 77–79, respectively, is possible. The uppermost stocker member 101 is provided with a position detecting piece 104 at its rear end position. The position detecting piece 104 is used for highly accurate position detection as will be described later.

Division sliding members 105 and 106 are attached to the uppermost stocker member 101. Each of the division sliding members 105 and 106 has a flat portion which slides on the top surface of uppermost stocker member 101 and a pawl(s) 107 extending downward from a side portion and having a tip portion that is bent inward. The right-hand division sliding member 105 has two pawls 107 extending downward and the left-hand division sliding member 106 has one pawl 107 extending downward. One of the two pawls 107 of the right-hand division sliding member 105 and the pawl 107 of the left-hand division sliding member 106 are respectively provided with protrusions 108 which project outward. The protrusions 108 fit in elongated holes that are formed in the stocker guides 50 of the stairs sliding members 35 and 36, and are movable vertically while being guided by the elongated holes. Further, drive forces for advancing or retreating are transmitted from the stairs sliding members 35 and 36 to the protrusions 108.

Holding leaf springs 109 for holding a CD 14 are provided in each of the stocker members 100 and the uppermost stocker member 101 at both side positions somewhat closer to the front. CD mounting pawls 110 are formed at certain intervals in the rear of the holding leaf springs 109. A CD 14 is held by the stocker member 100 or the uppermost stocker member 101 such that relatively rear portions of its outer periphery are placed on relatively inner tip portions of the CD mounting pawls 110 and pushed rearward by the holding leaf springs 110. Division protrusions 111 are formed on side surfaces of the stocker members 100 and the uppermost stocker member 101, respectively, at the same height, thereby the stocker 13 can be divided selectively by the stocker stoppers 51 of the stairs sliding members 35 and 36 and the pawls 107 of the division sliding members 105 and 106.

Figure 16:
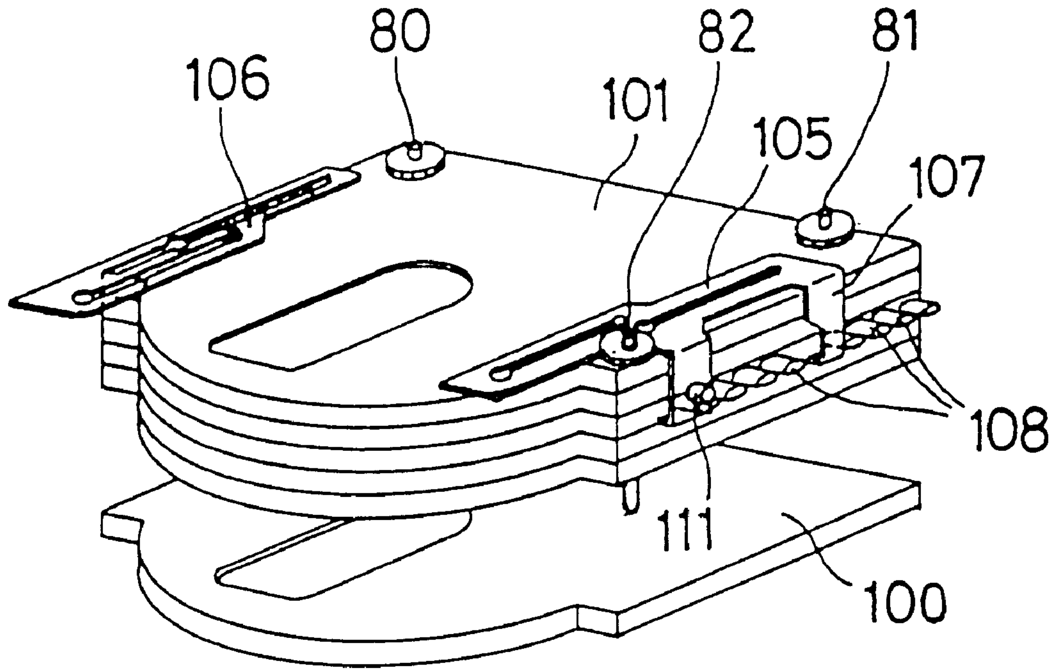
FIG. 16 is an overall perspective view of the stocker shown in FIG. 1 in a divided state.

FIG. 16 is an overall perspective view of the stocker 13 in a divided state. The division protrusions 111 are formed at the same height. The pawls 107 of the division sliding members 105 and 106 and the stocker stoppers 51 of the stairs sliding members 35 and 36 touch adjacent ones of the division protrusions 111 from below and from above, respectively. When the feed screws 80–82 are rotated by driving, i.e., rotating, the stocker motor 32, an upper part of the stocker 13 from a stocker member 100 selected by the pawls 107 to the uppermost stocker member 101 is lifted and separated from the rest of the stocker 13.

Figure 17:
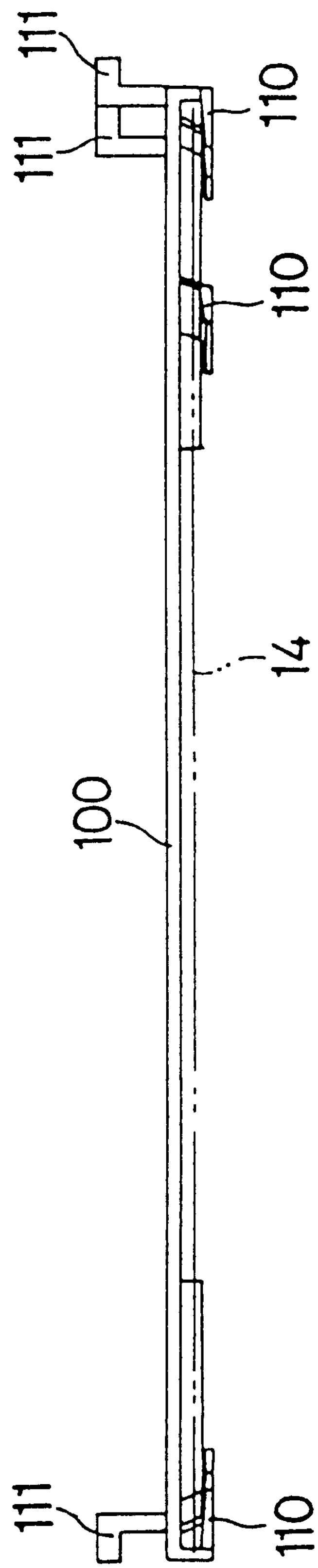
FIG. 17 is a front view of each stocker member of the stocker shown in FIG. 1.
Figure 18:
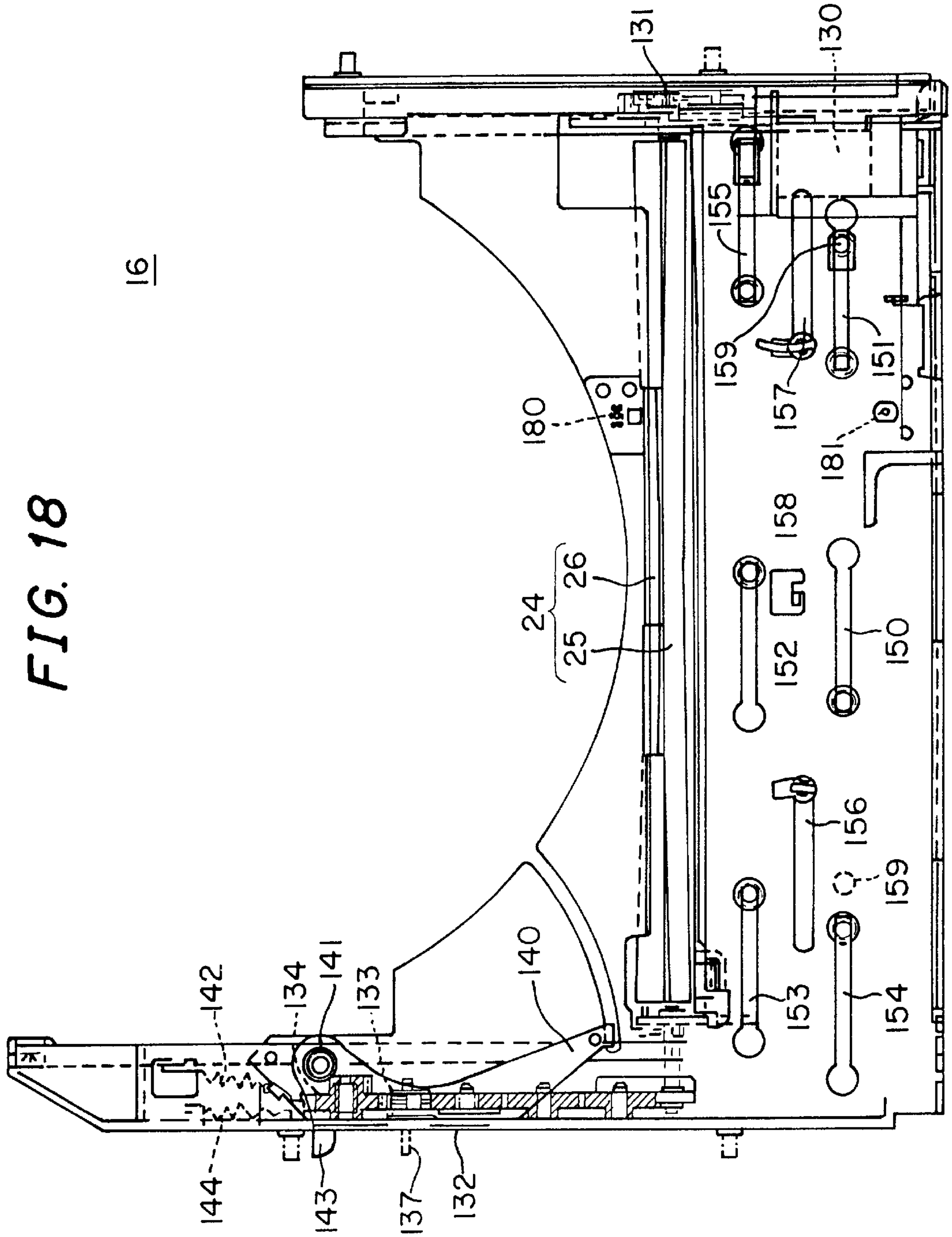
FIG. 18 is a plan view of a rack shown in FIG. 1.
Figure 19:
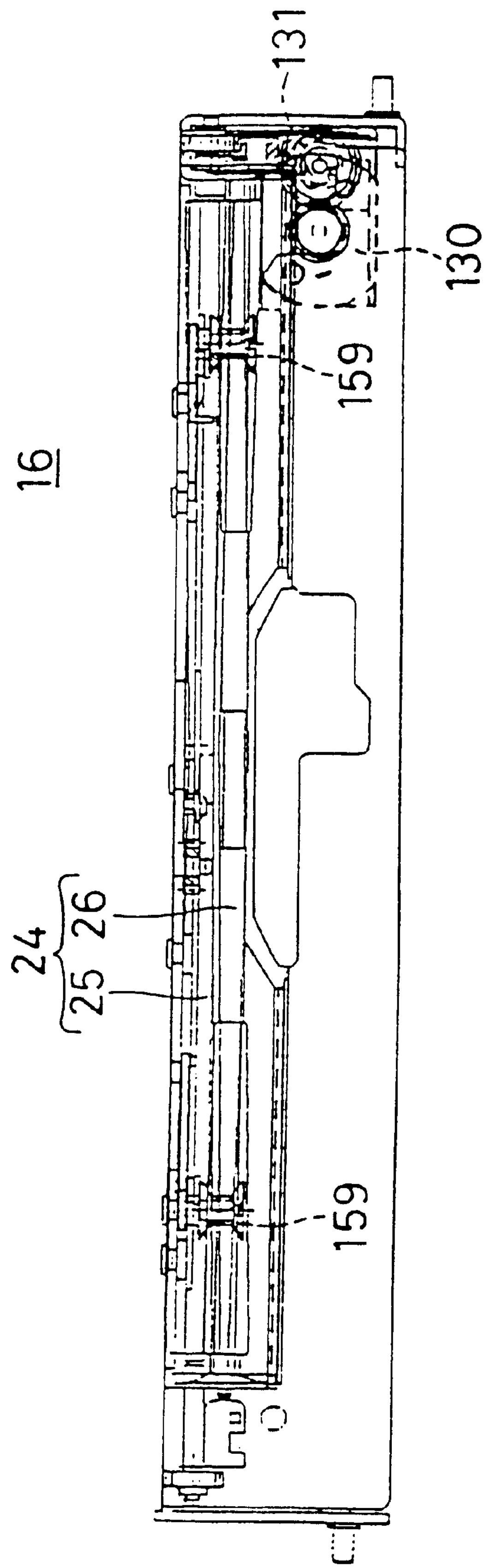
FIG. 19 is front view of the rack 16 shown in FIG. 1.
Figure 20:
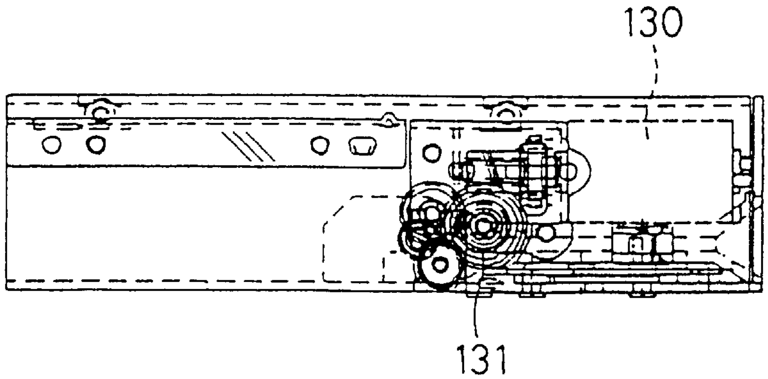
FIG. 20 is a right-hand side view of the rack 16 shown in FIG. 1.
Figure 21:
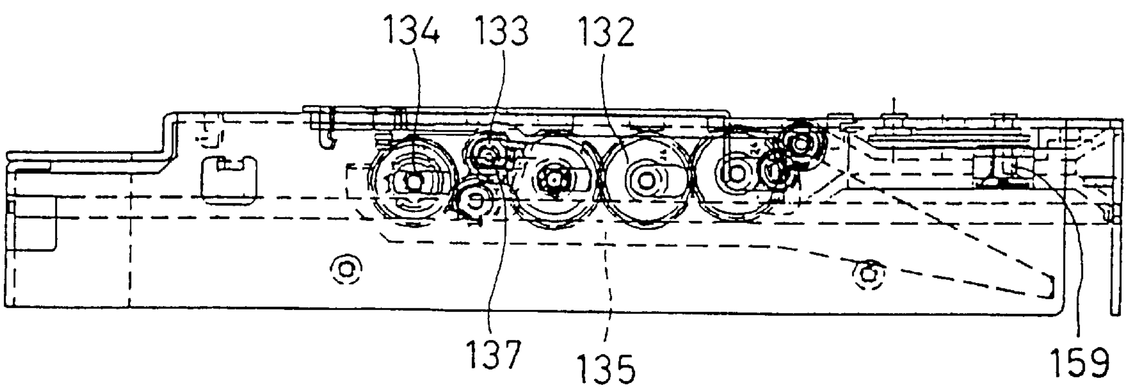
FIG. 21 is a left-hand side view of the rack 16 shown in FIG. 1.

FIG. 17 shows the structure of each stocker member 100. A turn table elongated hole 112, into which the central shaft of the turn table 27 (described later) can be inserted, is formed in the stocker member 100 in a portion on the front side of the center. A push-out cut 113, through which the tip of the above-mentioned push-out lever 72 can enter, is formed in a rear end portion of the stocker 100. A similar turn table elongated hole and push-out cut are formed in the uppermost stocker member 101.

As shown in FIG. 6, a stocker position sensor 114, which is coupled with the position detection piece 104 of the uppermost stocker member 101, is mounted on the base 30 at its rear end position. The stocker position sensor 114, which is implemented by a variable resistor having a straight-moving sliding piece, can detect the displacement of the uppermost stocker member 101 as an electrical signal as the sliding piece moves straight along a vertical direction. An adjustment screw 115 is provided to adjust the fixing position of the stocker position sensor 114, and a fixing screw 116 is also provided to fix the sensor 114 at an adjusted position. As for the position adjustment of the stocker position sensor 114, the vertical position is adjusted while the sensor 114 is pulled upward by a spring 117 and the sensor 114 is fixed by the adjustment screw 115 such that no deviation occurs from an adjusted position.

Lock alignment members 118, which extend sideways in the horizontal direction from the lock sliding member 45, project from the left side wall of the base 30. Each lock alignment member 118 is formed into a hourglass shape in which the central diameter is smaller than diameters at the tip and the proximal end, and is inserted and fitted in an elongated-hole-shaped guide groove that is formed in the enclosure 12. The guide groove is formed so that its portion for engaging the lock alignment member 118 when the lock sliding member 45 is retreated or withdrawn has a small diameter. As a result, when the central small-diameter portion of the lock alignment member 118 is guided to the small-diameter portion of the guide groove, the lateral displacement of the lock alignment member 118 is restricted and hence alignment is effected. The side walls of the base 30 are provided with spring hooks 119 for receiving springs as the floating mechanism 17 which suspends the chassis 20 in the enclosure 12. The side walls of the base 30 are further mounted with damper fixing members 120 for damping in a floating state. A damper fixing member 121, which is made thinner than the damper fixing members 120 because of its mounting position, is mounted on the left side wall of the base 30 at its rear position. The cover 33 is provided with leaf springs 122 for pressing the top ends of the feed screws 80–82. The positions of the slits 39 are detected by a count sensor 123 of a photointerrupter as playable positions of the rack 16. When the push-out lever 72 is pushed rearward, an insertion completion SW 124 is turned on.

FIGS. 18–21 are a plan view, a front view, a right-hand side view, and a left-hand side view, respectively, of the rack 16 shown in FIG. 1. The driving of the transport rollers 24 for inserting/ejecting a CD 14 and the driving for advancing/retreating the PU unit 15 are performed by commonly using the rotational force generated by an insertion/ejection motor 130. The insertion/ejection motor 130 is mounted on the rack 16 at its front-right position, and its rotational force drives the right end of the top roller 25 through a transmission gear 131. The top roller 25 has both a function as one of the transport rollers 24 and a function as a transmission path of the rotational force for advancing/retreating the PU unit 15. When the top roller 25 is rotated through the transmission gear 131, the rotational force is transmitted from the right end to the left end of the top roller 25 and a transmission gear 132, provided at a left position of the rack 16, is driven.

A pinion gear 134 couples the end of the transmission gear 132 through a movable gear 133. The movable gear 133 can be moved vertically by the transport switching cam 49 which is formed in the lock sliding member 45. When the movable gear 133 is moved upward, the transmission of drive force between the final-stage gear of the transmission gear 132 and the pinion gear 134 is cut off. In a state that the movable gear 133 meshes with the transmission gear 132 and the pinion gear 134, the pinion gear 134 is driven, i.e., rotated, by the rotational force from the insertion/ejection motor 130. It is therefore possible to advance in a rearward direction, i.e., away from the rack 16, a rack of the PU unit 15 which meshes with the pinion gear 134 or withdrawn the advanced PU unit 15 to the rack 16 side.

A lock sliding plate 135, which is a thin metal plate, is provided between the side wall of the rack 16 and the transmission gear 132/movable gear 133, and urged rearward by a spring 136. The front end of the lock sliding plate 135 engages the front end of the PU unit 15. When the PU unit 15 is moved and the lock sliding plate 135 is thereby pulled rearward by the spring 136, a lock portion formed in the lock sliding plate 135 fixes the movable gear 133 at the drive force transmission position between the transmission gear 132 and the pinion gear 134. That is, once the PU unit 15 starts to move rearward from the tip position of the rack 16, a state is established in which the movable gear 133 always transmits the drive force from the transmission gear 132 to the pinion gear 134. The lock sliding plate 135 allows vertical movement of the movable gear 133 only when the PU unit 15 is in a waiting state at the tip position of the rack 16. The lock sliding plate 135 can cut off the transmission path by lifting upward a shaft 137 of the movable gear 133, which projects outward from the side wall of the rack 16, with the transport switching cam 49 of the lock sliding member 45. Followers 138 and 139, which fit in the stairs grooves 37 and 38 of the stairs sliding members 35 and 36, respectively, project from the left and right side walls of the rack 16, respectively.

A push-in lever 140 is provided on the rack 16 at its left end position above the transmission gears 132, the movable gear 133, and the pinion gear 134. The push-in lever 140 is for pushing an inserted CD 14 toward the stocker 13 side when its tip portion makes an angular displacement about a swing shaft 141 which is disposed close to the proximal end of the lever 140. The push-in lever 140 is urged by a spring 142 in a direction opposite to the push-in direction. A transmission lever 143 is provided to impart push-in angular displacement to the push-in lever 140. The transmission lever 143 is urged in a direction opposite to the push-in direction of the push-in lever 140 by a spring having a weaker resilient force than the spring 142 which urges the push-in lever 140. The transmission lever 143 is driven by a push-in cam formed in the lock sliding member 45.

The bottom roller 26 of the transport rollers 24 is mounted not right under the top roller 25 but somewhat in the rear of the top roller 25. Both ends of the shaft of the bottom roller 26 are supported by a U-shaped groove, and the bottom roller 26 is substantially movable in the vertical direction. The bottom roller 26 is pulled toward the top roller 25 by a bottom roller spring 146. When a CD 14 is inserted between the top roller 25 and the bottom roller 26, the tip of the inserted CD 14 is directed upward because the bottom roller 26 is located in the rear of the top roller 25, and the CD 14 is smoothly guided to the position where it is held by the holding leaf springs 109 and the CD mounting pawls 110 while touching a front projected portion of the stocker 13. If the bottom roller 26 were located right under the top roller 25, the tip of the inserted CD 14 might go down and thus make it difficult to perform smooth guidance.

A plurality of elongated holes 150–155 and engagement-groove-added elongated holes 156 and 157 are formed in a front-top plate of the rack 16. Each of the engagement-groove-added elongated holes 156 and 157 has an elongated hole portion that is parallel with the elongated holes 150–155 and a short engagement hole that is perpendicular to the elongated hole portion. The elongated holes 150–157 generally extend in the width direction. A spring hook 158 is also formed in the top plate of the rack 16. The elongated holes 150–157 and the spring hook 158 are used as part of a disk check mechanism having pins 159 which mechanism is incorporated in a front-top portion of the rack 16.

Figure 22:
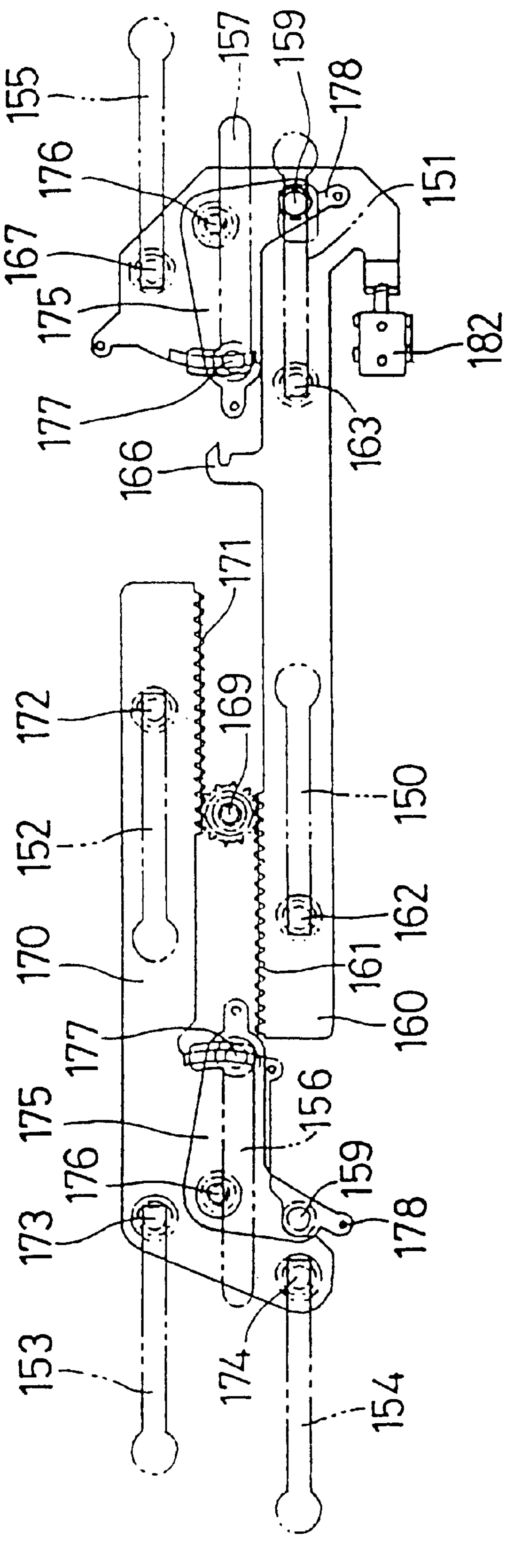
FIG. 22 is a plan view of a disk check mechanism provided on the rack 16 of FIGS. 18–21.

FIG. 22 shows the configuration of the disk check mechanism incorporated in the front-top portion of the rack 16. A rack 161 is formed in a rear portion of a sliding plate 160 which is located at a front position, and followers 162 and 163 which fit in the elongated holes 150 and 151, respectively, are projected from the sliding plate 160. A pin 164 extends from the sliding plate 160 and a spring hook 166 is also formed in the sliding plate 160. The rack 161 of the sliding plate 160 meshes with a link gear 169, which also meshes a rack 171 formed in a front portion of a sliding plate 170 which is located at a rear position. The sliding plate 170, which is generally L-shaped, has a portion formed with the rack 171 and extending in the width direction and a portion extending to the front side from the left end of the former portion. Followers 172 and 173 which fit in the elongated holes 152 and 153, respectively, of the rack 16 extended from the portion extending in the width direction and a follower 174 which fits in the elongated hole 154 is erected from the portion extending to the front side at a position close to its tip. A swing shaft 176 of a swing lever 175 is fixed to the sliding member 170 at its bending portion. Also the swing lever 175 is generally L-shaped. A follower 177 is erected from a tip portion of one arm of the swing lever 175, and fits in the engagement-groove-added elongated hole 156 which is formed in the rack 16. A pin 159 is formed at a tip portion of the other arm of the swing lever 175. A similar swing lever 175 is provided above a right portion of the sliding plate 160, and a follower 177 at a tip portion of one arm of the swing lever 175 fits in the engagement-groove-added elongated hole 157. A follower 167 which fits in the elongated hole 155 is also erected from the sliding plate 160.

A pulling spring, which is provided between the spring hook 166 of the sliding plate 160 and the spring hook 158 of the rack 16, urges the followers 162, 163, and 167 erected from the sliding plate 160 so that they touch the left ends of the elongated holes 150, 151, and 155, respectively. The followers 172, 173, and 174 erected from the sliding plate 170 touch the right ends of the elongated holes 152–154, respectively. Each swing lever 175 is urged by a spring so that the follower 177, erected from the tip portion of one arm of the swing lever 175, falls into the engagement groove portion of the engagement-groove-added elongated hole 156 or 157.

When a CD 14 is inserted, the interval between the pins 159, which are mounted on the arms of the swing levers 175 which are different from the arms from which the followers 177 are erected, is forcibly increased, so that the followers 177 are released from the engagement groove portions of the engagement-groove-added elongated holes 156 and 157. Thus, the sliding plate 160 is rendered movable rightward by the right-hand swing lever 175, and the sliding plate 170 is rendered movable leftward by the left-hand swing lever 175. The sliding plates 160 and 170 cannot move in a state where the follower 177 of at least one of the swing levers 175 remains in the engagement groove of the engagement-groove-added elongated hole 156 or 157. That is, a CD 14 can be accepted only in a state where both swing levers 175 can be pushed outward at the same time. This mechanism prevents an event in which a CD whose diameter is different from 12 cm (diameter of a standard CD 14), for instance, a 8-cm-diameter (so called "single") CD, is erroneously inserted. Since the interval between the pins 159 mounted on the swing levers 175 is slightly larger than 8 cm, the sliding plates 160 and 170 cannot be moved horizontally when it is attempted to insert an 8-cm-diameter CD.

As shown in FIGS. 19–22, two light-emitting diodes (hereinafter abbreviated as "LEDs") 180 and 181 are provided on the rack 16 at a certain interval so as to be located on a straight line extending in the front-rear direction. Light beams emitted from the LEDs 180 and 181 are detected by photosensors (described later) provided in the PU unit 15. A movement of the sliding member 160 in the rack 16 is detected by an insertion sensing SW 182 so that the insertion of a CD 14 can be detected.

Figure 23:
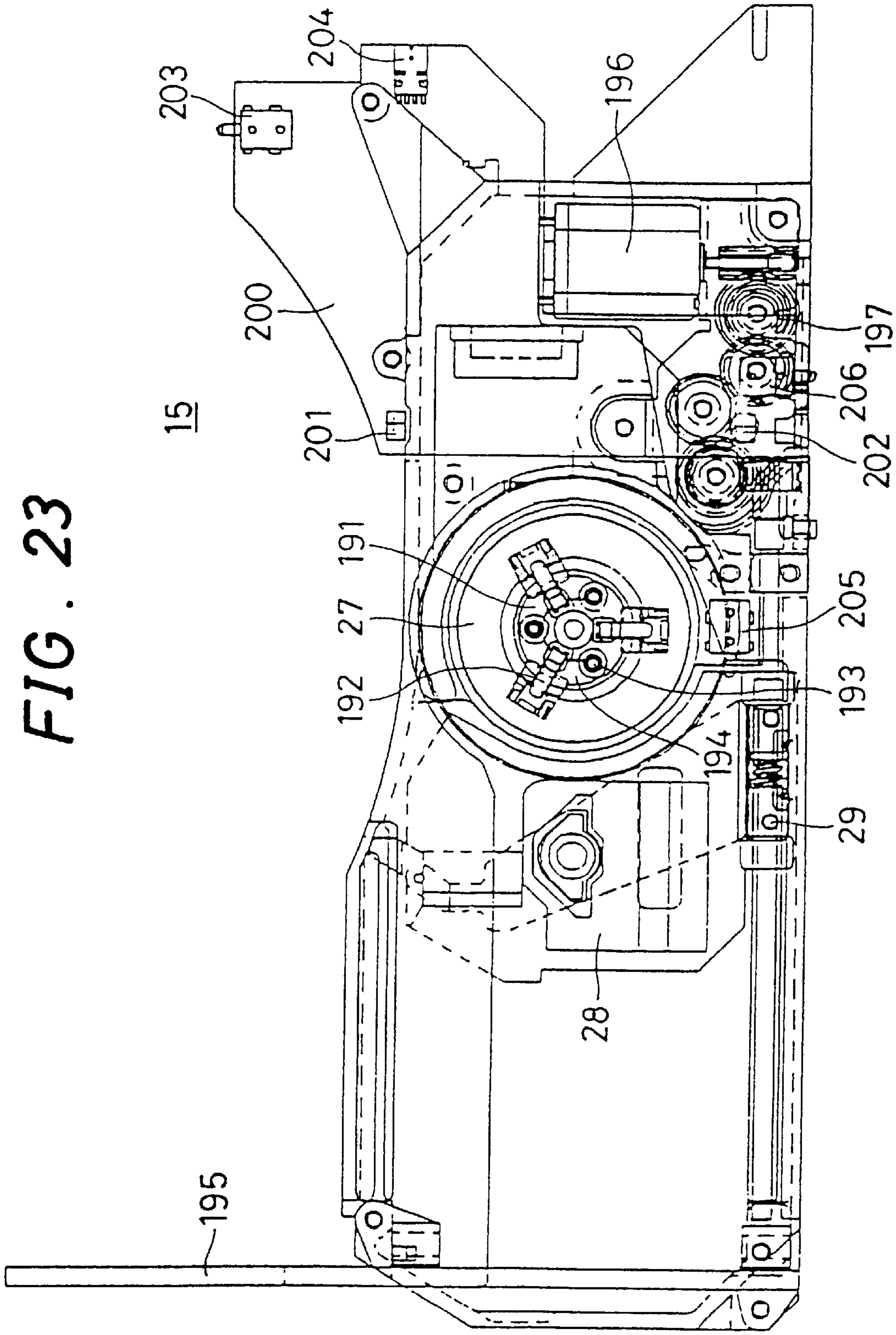
FIG. 23 is a plan view of a PU unit 15 shown in FIG. 1.
Figure 24:
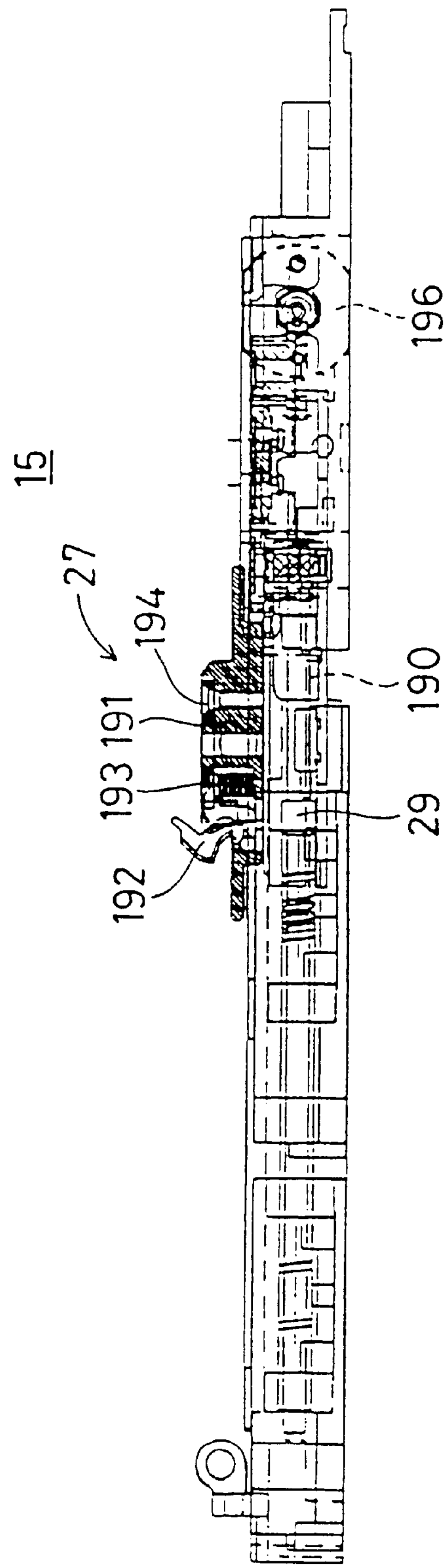
FIG. 24 is a front view of the PU unit 15 shown in FIG. 1.
Figure 25:
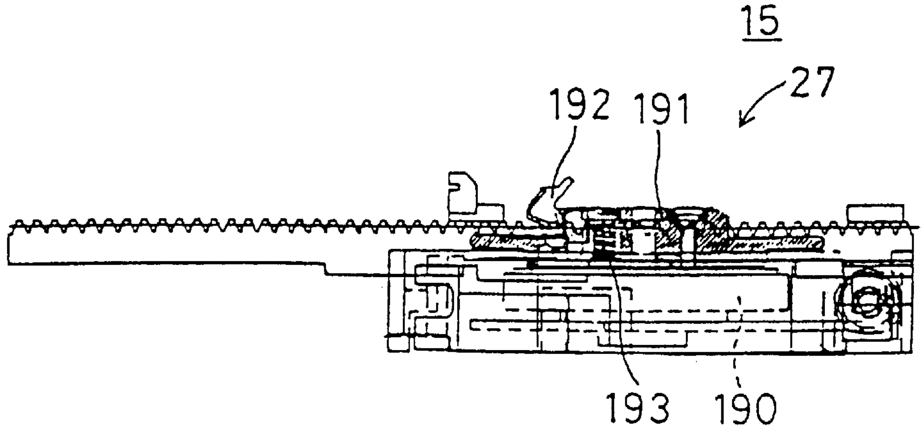
FIG. 25 is a left-hand side view of the PU unit 15 shown in FIG. 1.

FIGS. 23–25 are a plan view, a front view, and a left-hand side view of the PU unit 15 shown in FIG. 1. The turn table 27 is provided approximately at the center of the PU unit 15, and its central shaft 191 is directly driven, i.e., rotated, by a motor 190. A plurality of pawls 192 are mounted on the central shaft 191, and are so urged as to expand outward in radial directions by springs 193 which are mounted on the central shaft 191 at its relatively inner positions. The springs 193 are held by a cover 194. Since the springs 193 are small-diameter compression springs and can be inserted along the axial direction of the central shaft 191, the related assembling can be performed relatively easily. The tracking mechanism 29 for moving the PU 28 is provided on the left of the turn table 27. A rack 195 which meshes the pinion gear 134 mounted on the rack 16 is also provided on the left of the PU unit 15, and converts the rotational force of the pinion gear 134 into a straight movement of the PU unit 15. The tracking mechanism 29 is driven by a motor 196 which is disposed on the right of the turn table 27 of the PU unit 15 and a transmission gear 197 for transmitting the rotational drive force of the motor 196.

A sensor board 200 is mounted on a portion of the PU unit 15 that is on the right of the turn table 27 at its rear position. Photosensors, i.e., an ejection completion sensor 201 and a disc presence detection sensor 202, for receiving light emitted from the LED 180 which is mounted on the rack 16, are mounted at a given interval on a straight line extending in the front-rear direction. A clamping position SW 203, for detecting that the PU unit 15 has advanced to the rearmost position and reached a clamping position where a CD 14 held by the stocker 13 can be inserted to the central shaft 191, is mounted on the sensor board 200 at its rear end. A play position sensor 204, for detecting a play position where the PU unit 15 is located to play back a CD 14 after a retreat from the clamping position, is mounted on the sensor board 200 at its right position. The play position sensor 204 is implemented by a photointerrupter, and a member of interrupting light is disposed at the play position. A PU origin SW 205, for sensing a state in which the PU 28 is located at the origin is provided under the turn table 27 at a relatively front or forward position. Also provided is a unit origin SW 206 which has a detection end slightly projecting from the front end of the PU unit 15 and detecting that the PU unit 15 is located at the origin, i.e., the front of the rack 16.

Figure 26:
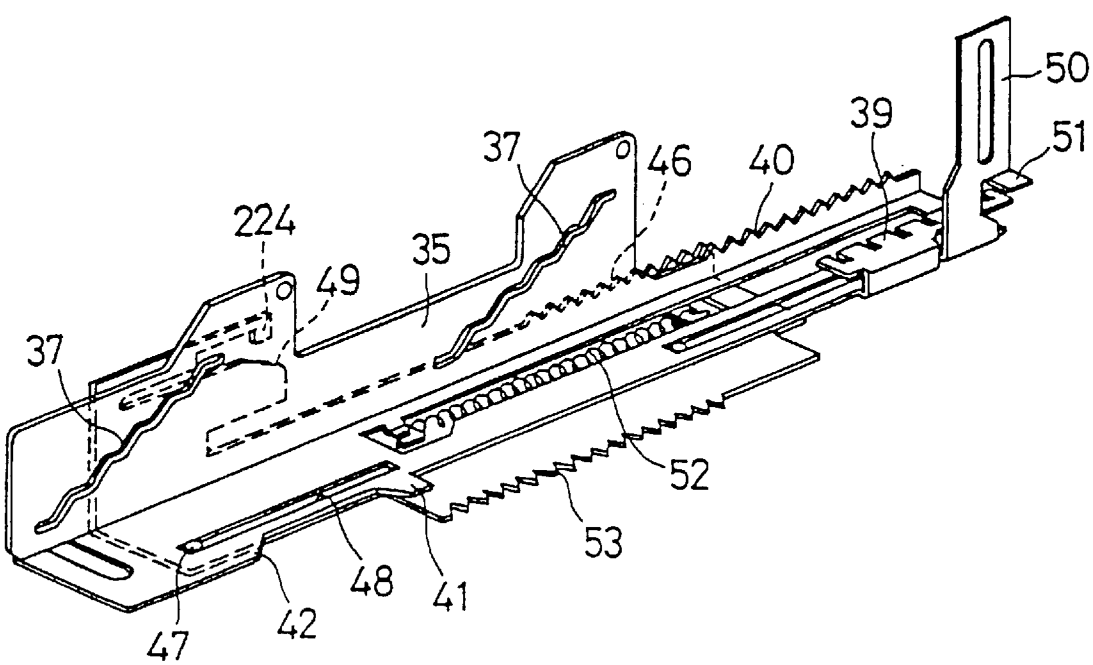
FIG. 26 is a perspective view of a stairs sliding member 35 and a lock sliding member 45 shown in FIGS. 6–10.
Figure 27:
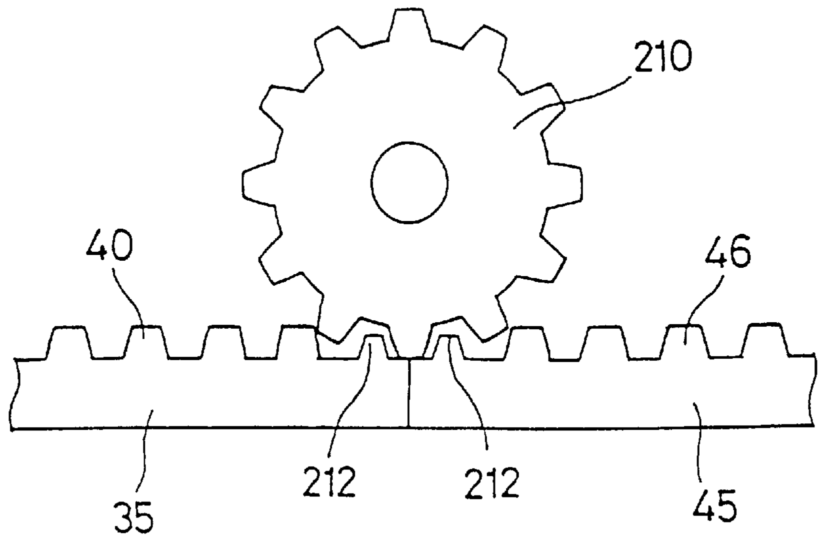
FIG. 27 is a left-hand side view showing how rack portions of the stairs sliding member 35 and the lock sliding member 45 are related to each other in operation.

FIG. 26 shows that the left-hand stairs sliding member 35 and the lock sliding member 45 are linked in motion to each other, and FIG. 27 shows how the stairs rack 40 and the lock rack 46 are driven. The lock sliding member 45 is provided between the stairs sliding member 35 and the base 30 and is formed with the transport switching cam 49. The stairs sliding member 35 has the stairs rack 40 which meshes a pinion 210 which is driven, i.e., rotated, by the stairs motor 31. The pinion 210 can also mesh with the lock rack 46 of the lock sliding member 45. However, there does not occur an event where that both of the stairs rack 40 and the lock rack 46 mesh with the pinion 210 at the same time, i.e., only one of those racks meshes with the pinion 210. To provide smooth switching (transition) of meshing, in the switching portion between the stairs rack 40 and the lock rack 46, teeth 211 and 212 are so shaped as to be narrower than other teeth, for instance.

Figure 28:
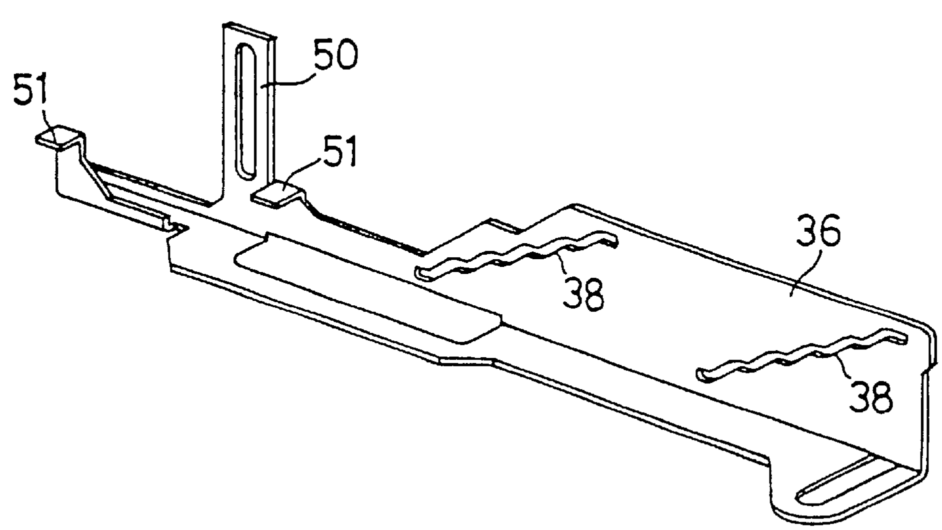
FIG. 28 is a perspective view of a stairs sliding member 36 shown in FIGS. 6–10.

FIG. 28 shows the structure of the right-hand stairs sliding member 36. Since the right-hand stairs sliding member 36 moves in the direction opposite to the moving direction of the left-hand sliding member 35, the stairs grooves 38 ascend in the direction opposite to the ascending direction of the stairs grooves 37 formed in the left-hand stairs sliding member 35.

Figure 29A:
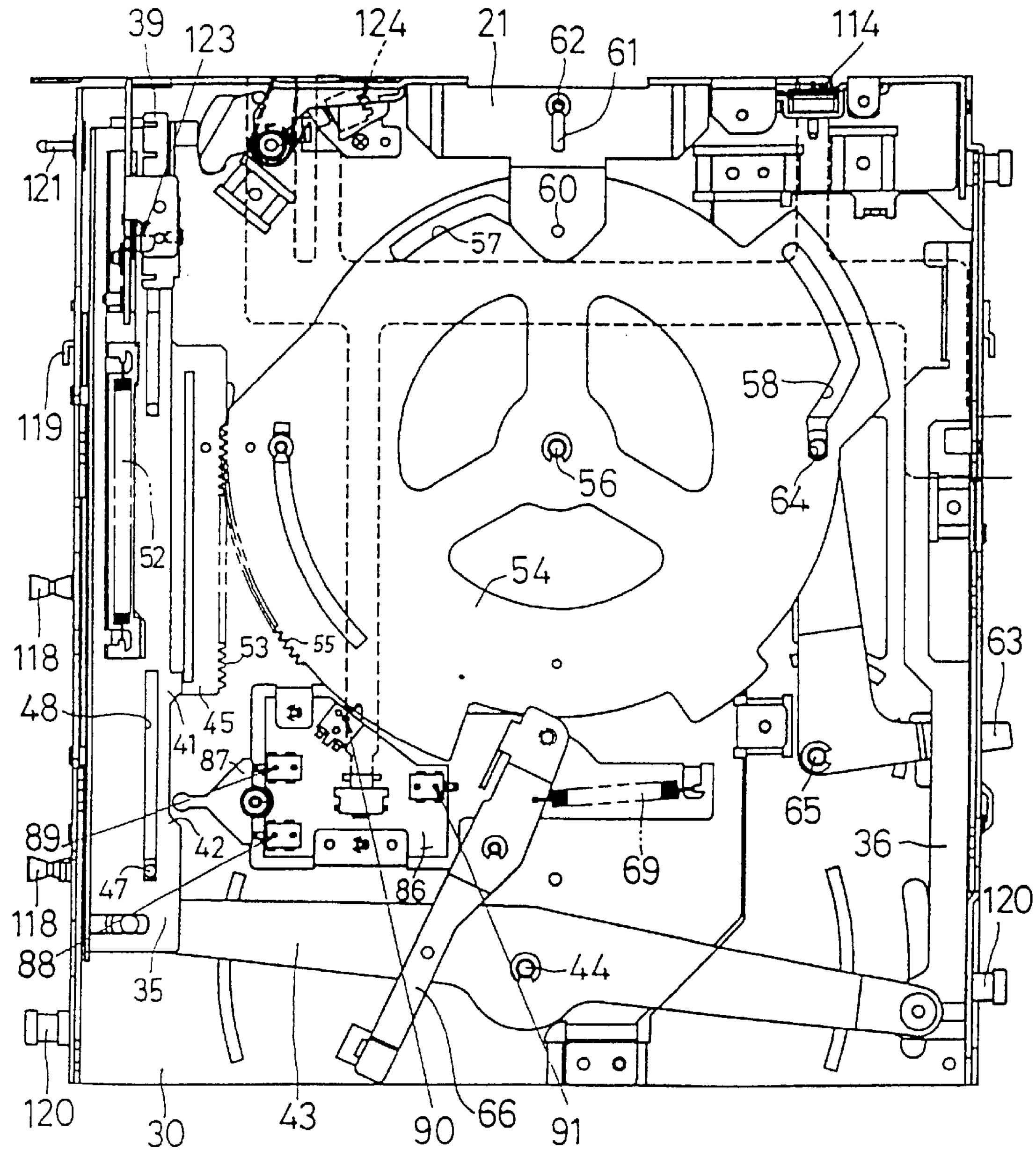
FIG. 29A is a simplified plan view showing a lock mechanism in a floating state shown in FIGS. 6–10.
Figure 29B:
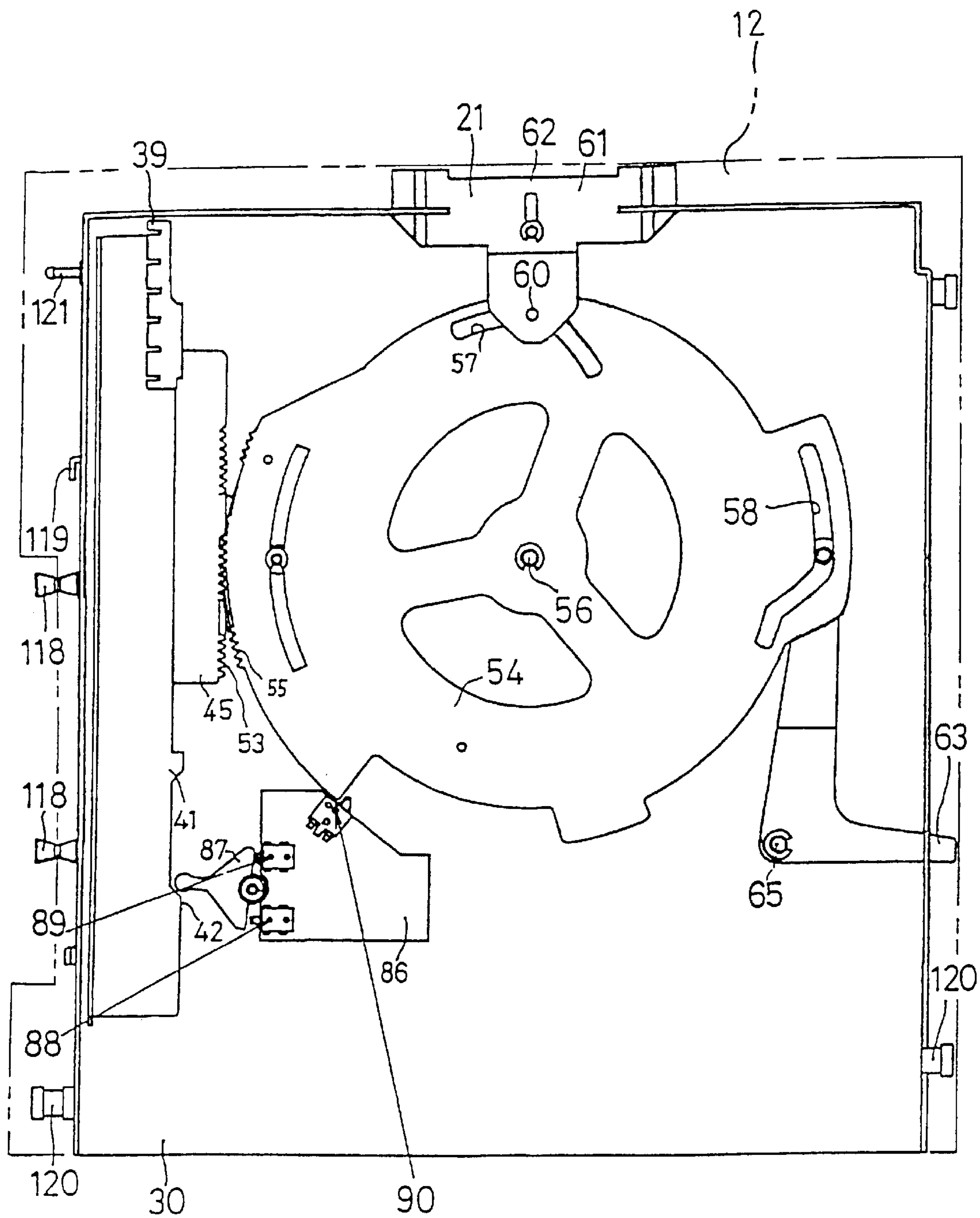
FIG. 29B is a further simplified plan view showing a lock position where the floating state of FIG. 29A is canceled.

FIGS. 29A and 29B show how the lock pawl 21, the side lock lever 63, and the lock alignment members 118 operate as the cam member 54 angularly displaces. FIG. 29A corresponds to a floating state. As shown in FIG. 29B in a simplified manner, at the lock position where the lock sliding member 45 is retreated or withdrawn, the lock pawl 21 projects rearward, the side lock lever 63 projects rightward, and the lock alignment members 118 are moved to the rear side. The lock position SW 90 is in an off-state. When the lock pawl 21 projects rearward to push against the rear wall of the enclosure 12, its reaction force presses the chassis 20 against the front opening 23 side of the enclosure 12 and the former is fixed to the latter.

Figure 30A:
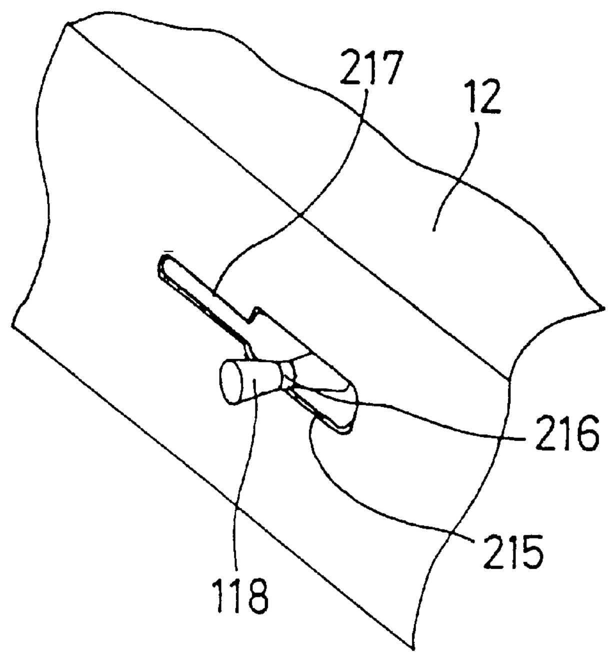
FIGS. 30A and 30B are perspective views illustrating how a lock alignment member 118 operates.
Figure 30B:
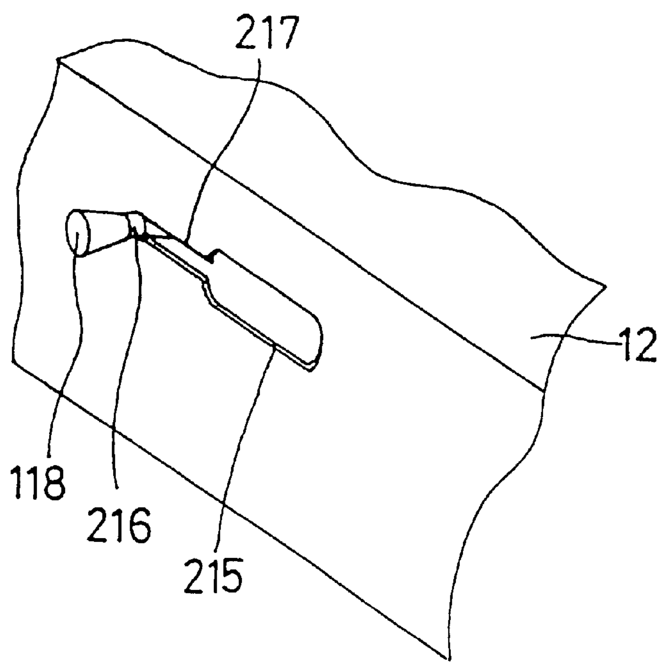

FIGS. 30A and 30B illustrate how the lock alignment member 118 operates. As shown in FIG. 30A, the lock alignment member 118 is inserted in a guide groove 215 formed in the side wall of the enclosure 12. The lock alignment member 118 moves together with the lock sliding member 45. When a small-diameter portion 216 is guided to an alignment portion 217 of the guide groove 215, as shown in FIG. 30B, the movement of the lock alignment member 118 in the axial direction is restricted.

Figure 31:
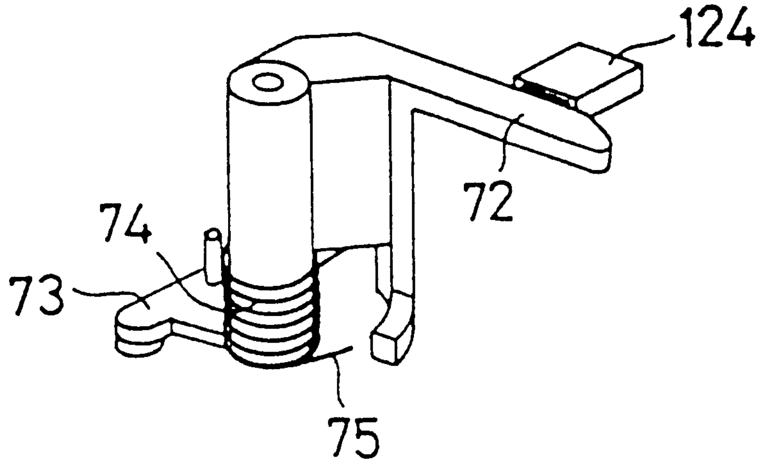
FIG. 31 is a perspective view showing a configuration relating to a push-out lever 72 shown in FIGS. 6–10.
Figure 32:
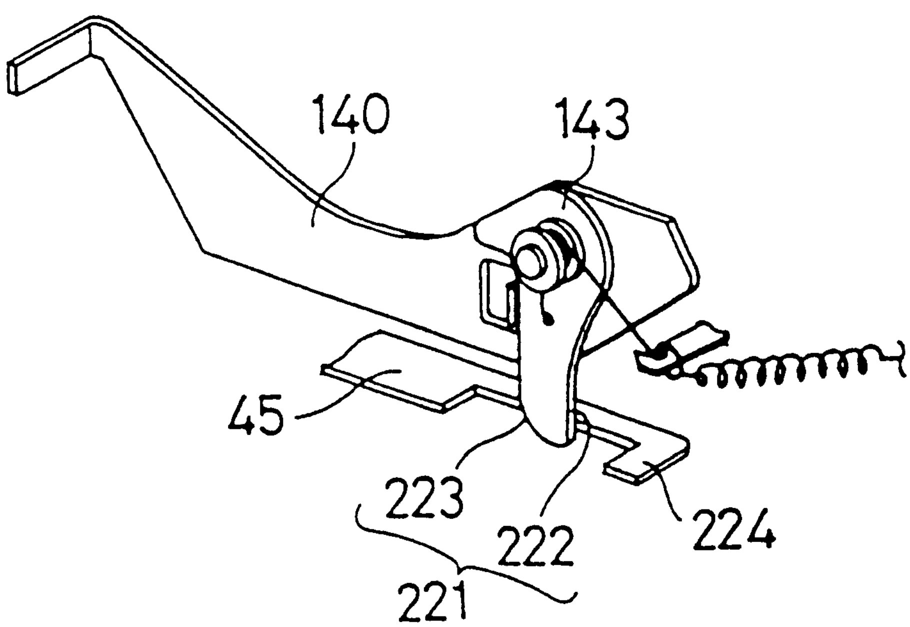
FIG. 32 is a perspective view showing a configuration relating to a push-in lever 140 shown in FIGS. 19–22.

FIGS. 31 and 32 show configurations relating to the push-out lever 72 and the push-in lever 140, respectively. Referring to FIG. 31, since the spring 74 is provided between the push-out lever 72 and the transmission lever 73, the push-out lever 72 is pushed rearward when a CD 14 is inserted into the stocker 13, to turn on the insertion completion SW 124. Referring to FIG. 32, a protrusion 221 of the transmission lever 143 has a straight portion 222 and a curved portion 223. Therefore, when a protrusion 224 formed in the lock sliding member 45 touches the straight portion 222, a drive force for causing angular displacement of the push-in lever 140 is transmitted. When the protrusion 224 touches the curved portion 223, only the transmission lever angularly displaces and no drive force is transmitted to the push-in lever 140.

Figure 33:
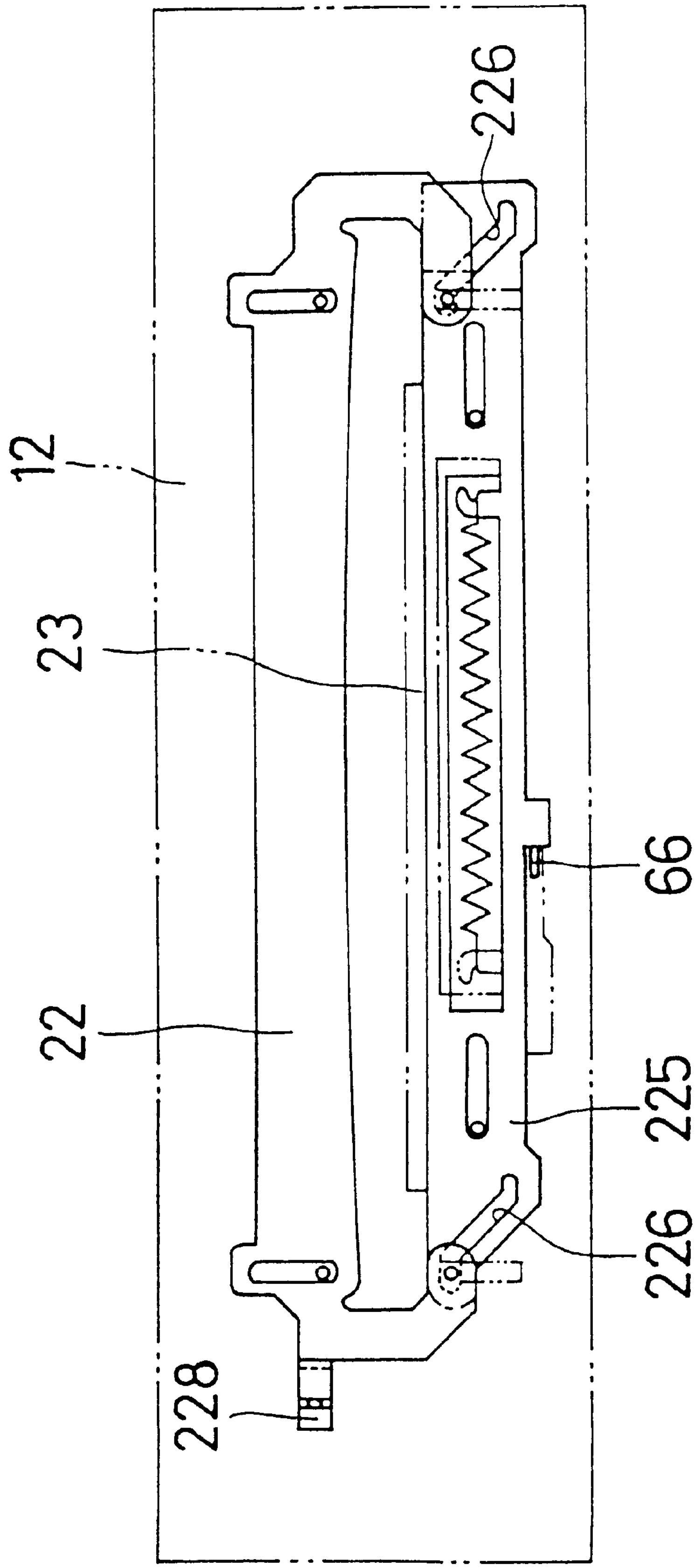
FIG. 33 is a simplified front view showing a configuration relating to a shutter 22 shown in FIG. 1.

FIG. 33 shows a configuration relating to the shutter 22 shown in FIG. 1. The shutter 22 is opened only at the position where the lock sliding member 45 is fully retreated or withdrawn by the drive force that is imparted through the shutter transmission lever 66. A CD 14 can be inserted or ejected smoothly in this state because the chassis 20 is fixed to the enclosure 12 by means of the lock pawl 21, the side lock lever 63, and the lock alignment members 118. The tip of the shutter transmission lever 66 moves a sliding plate 225 laterally. The lateral displacement is converted into a vertical opening/closing operation through a pin of the shutter 22 that fits in a slant groove 226. An extraction detection sensor 228, which is a photointerrupter, detects whether the shutter 22 is closed or not. The extraction detection sensor 228 is rendered on when the opening 23, i.e., the shutter 22, is opened by means of the tip of the shutter transmission lever 66. In a state in which a CD 14 remains at the opening 23 after being inserted when the shutter 22 was once opened, the extraction detection sensor 228 remains on because the shutter 22 cannot be closed. The extraction detection sensor 228 returns to an off-state when the CD 14 is pulled out.

Figure 34:
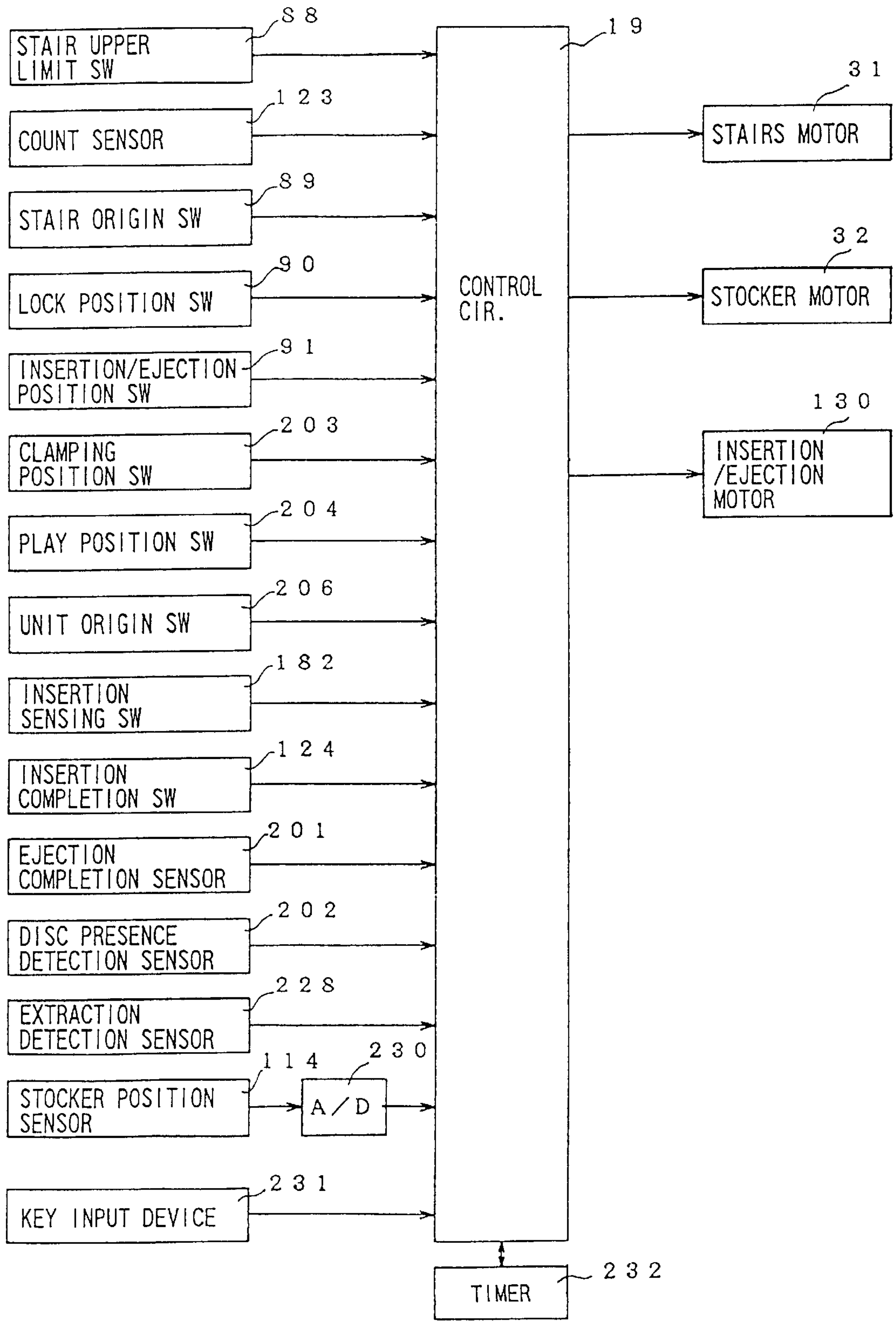
FIG. 34 is a block diagram showing an electrical configuration relating to a control circuit 19 shown in FIG. 1.

FIG. 34 shows an electrical configuration relating to the control circuit 19 of the autochanger apparatus 11 shown in FIG. 1. A voltage output corresponding to the absolute position of the position detection piece 104 is obtained from the stocker position sensor 114. This voltage output is converted by an analog/digital conversion (hereinafter abbreviated as "A/D") circuit 230 into digital data, which is input to the control circuit 19. The control circuit 19 is implemented by a programmed operation of a microcomputer. Signals from other switches and sensors are also input to the control circuit 19, and the stairs motor 31, the stocker motor 32, and the insertion/ejection motor 130 are driven, i.e., rotated, according to preset programs. The movement position of the stairs sliding members 35 and 36 can be detected as a count value of the number of slits 39 that pass through the gap between a light-emitting element and a photodetecting element of the count sensor 123, which is implemented by a photointerrupter. A key input device 231 (instruction input means) for inputting a desired operation state of the autochanger apparatus 11 and a timer 232 for setting/measuring time are also connected to the control circuit 19.

Figure 35:
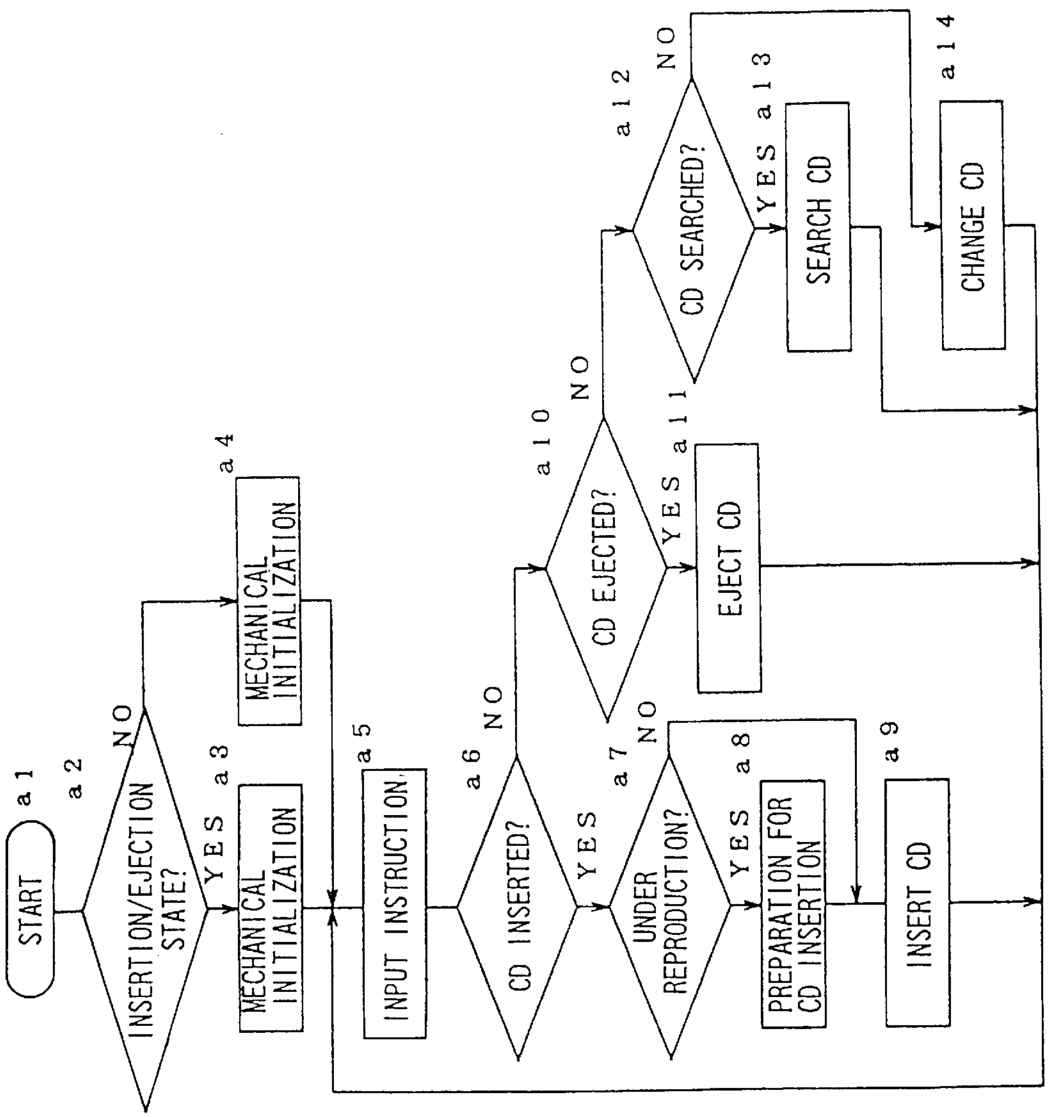
FIG. 35 is a flowchart showing the entire process performed by the control circuit 19 shown in FIG. 34.

FIG. 35 shows a process performed by the control circuit 19 shown in FIG. 34. The process starts at step al. At step a2, it is judged whether an insertion/ejection state for performing insertion or ejection of a CD 14 is currently established. If the insertion/ejection state is established, a mechanics initializing operation for the insertion/ejection state is performed at step a3. If the insertion/ejection state is not established, a mechanics initializing operation for states other than the insertion/ejection state is performed at step a4. After completion of the mechanics initialization of step a3 or a4, the process waits for instruction input from the key input device at step a5. Upon instruction input, it is judged at step a6 whether an instruction of CD insertion has been made. If it is judged that an instruction of CD insertion has been made, it is judged at step a7 whether a CD 14 is now being played back. If a CD 14 is being played back, an operation of ejecting the CD 14 being played back is performed at step a8 as a preliminary operation of CD insertion. When the preliminary operation of CD insertion at step a8 has been completed or if it is judged at step a7 that no CD 14 is being played back, a CD insertion operation is performed at step a9.

If it is judged at step a6 that an instruction of CD insertion has not been made, it is judged at step a10 whether an instruction of CD ejection has been made. If an instruction of CD ejection has been made, a CD ejection operation is performed at step a11. If it is judged at step a10 that an instruction of CD ejection has not been made at step a10, it is judged at step a12 whether an instruction of CD search has been made. If an instruction of CD search has been made, an operation of checking presence/absence of a CD 14 in each stage of the stocker 13 is performed at step a13. If an instruction of CD search has not been made at step a12, a CD change operation as a residual operation is performed at step a14. Upon completion of step a9, a11, a13, or a14, the process returns to step a5. Incidentally, if an instruction to perform some other operation of vehicular audio equipment, such as broadcast reception through a tuner, is made during a playback, the playback is suspended and a state capable of restarting the playback at any time is established.

Figure 36:
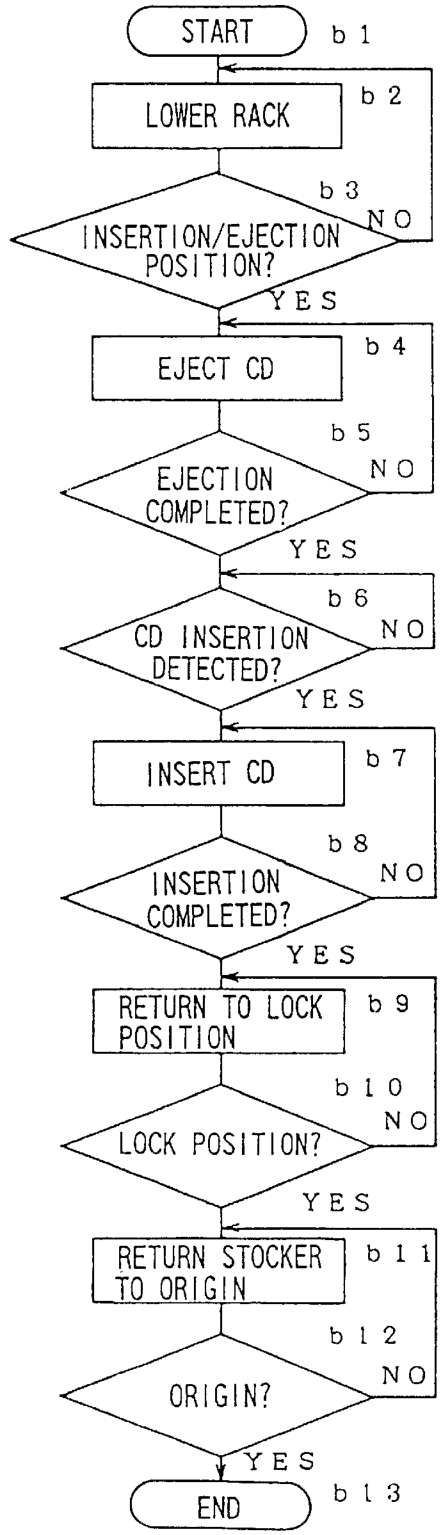
FIGS. 36 and 37 are a flowchart and a time chart, respectively, showing an operation performed by the electrical configuration of FIG. 34.
Figure 37:
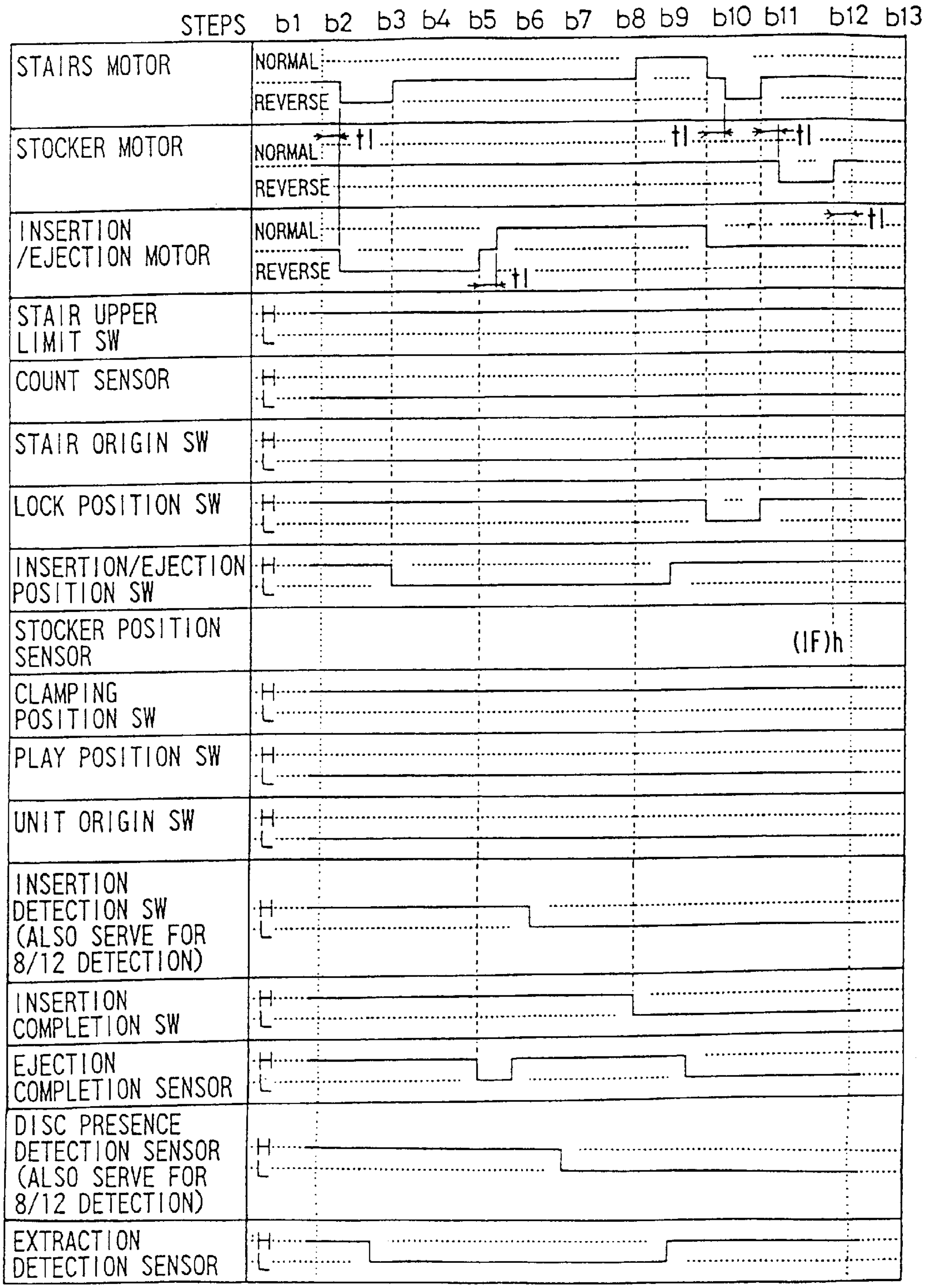

FIGS. 36 and 37 are a flowchart and a time chart of the mechanics initializing operation of step a3 shown in FIG. 35. The operation starts at step b1. At step b2, the rack 16 is lowered to the insertion/ejection position by reversely driving the stairs motor 31. When the insertion/ejection position SW 91 turns on at step b3, a CD electing operation of step b4 is started. When the election completion sensor 201 turns on at step b5, the CD ejection is completed. When the insertion detection SW 182 then turns on at step b6, a CD inserting operation of step b7 is started and continued until the insertion completion SW 124 turns on at step b8. At step b9, the stairs motor 31 is rotated normally and reversely and the lock position SW 90 changes from an off-state to an on-state. When it is detected at step b10 that the lock position SW has again changed to an off-state, a lock position returning operation is performed. Then, at step b11, the stocker 13 is lowered and returned to the origin by reversely driving the stocker motor 32. At step b12, it is judged whether an output of the stocker position sensor 114 corresponds to a value that is preset as the origin, for instance, (1F)h. The operation is finished at step b13. In the following, a notation is employed in which (IF)h, for instance, means that a parenthesized number "1F" is a 2-figure hexadecimal number.

Figure 38:
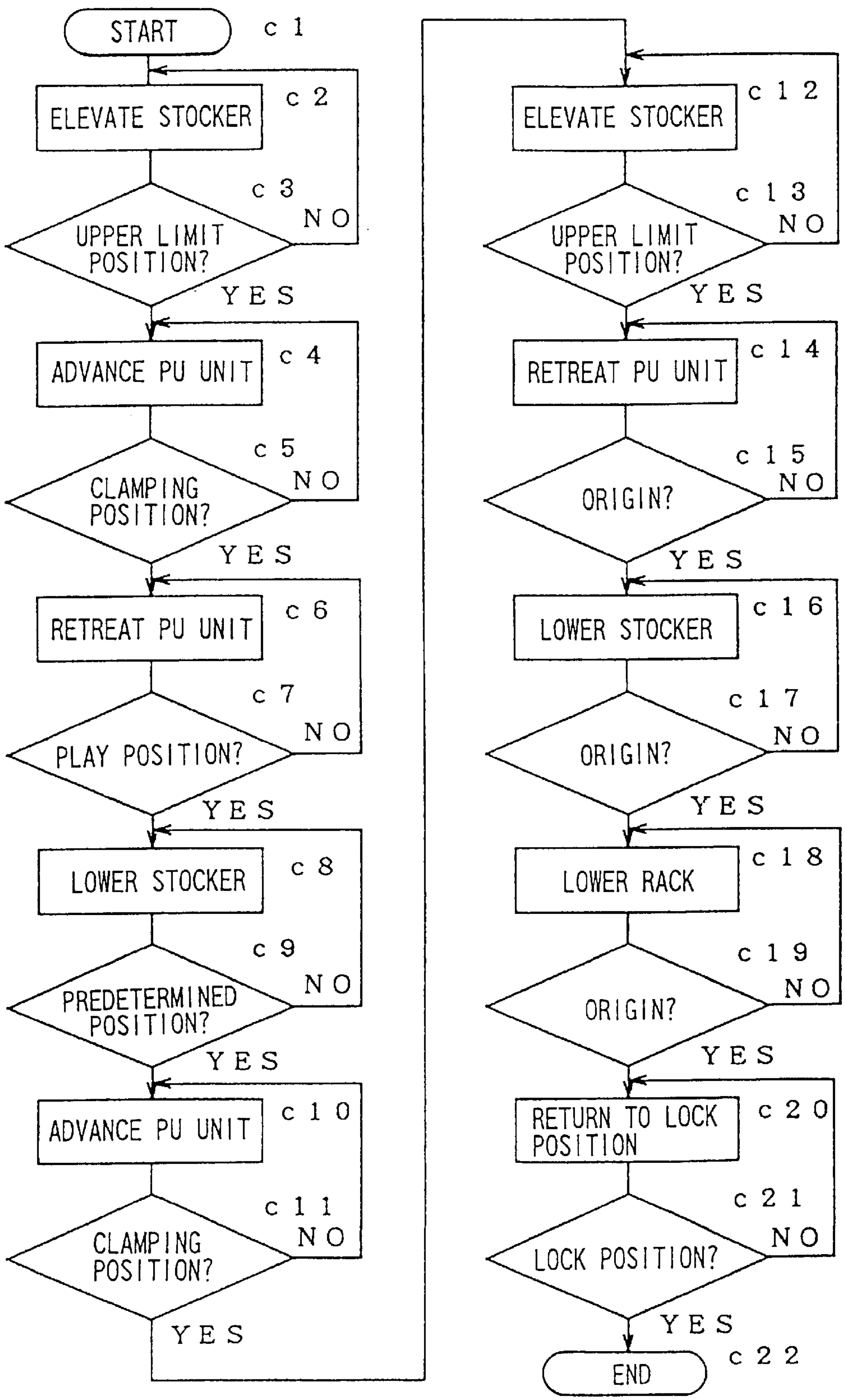
FIGS. 38 and 39 are a flowchart and a time chart, respectively, showing an operation performed by the electrical configuration of FIG. 34.
Figure 39:
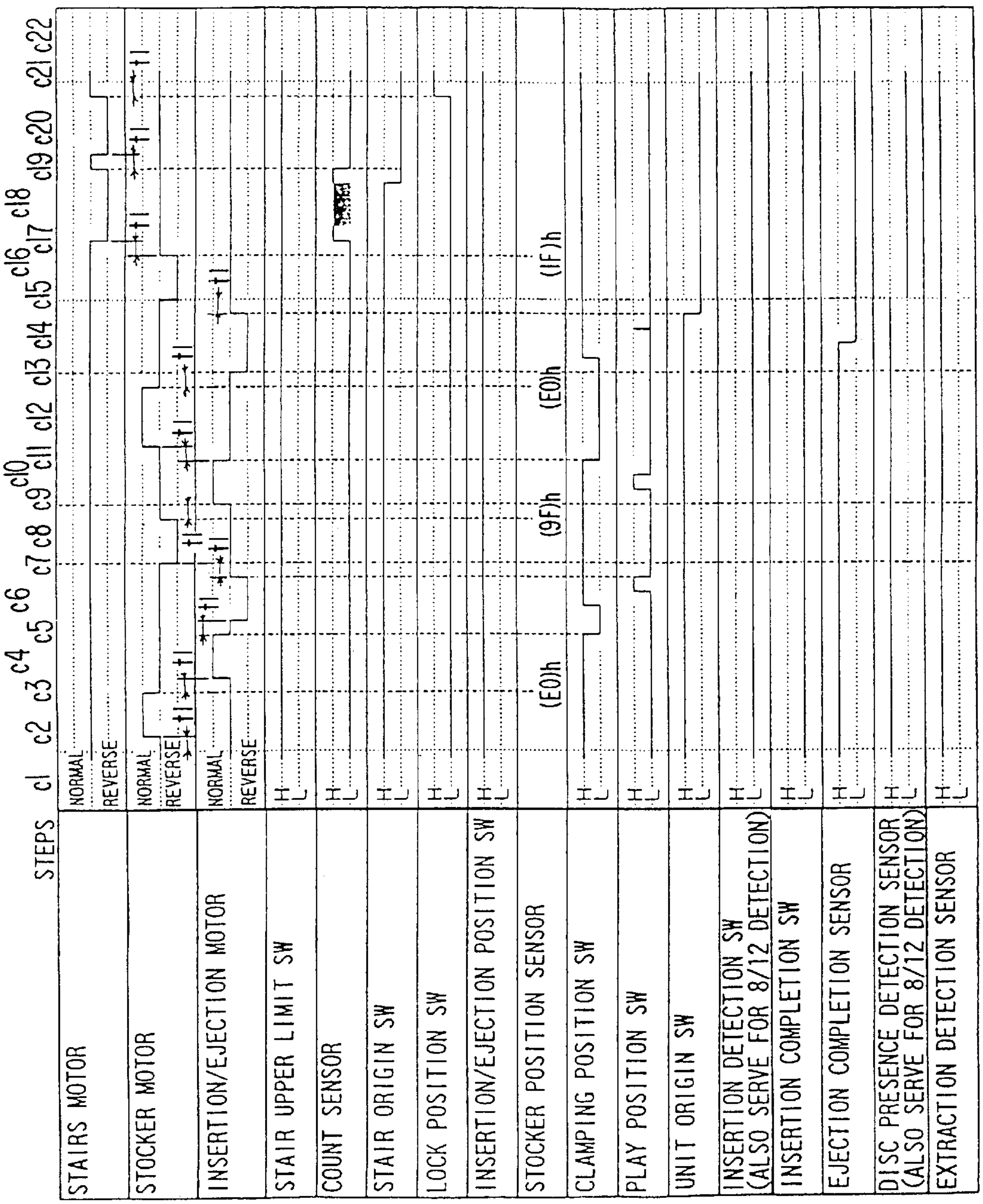

FIGS. 38 and 39 are a flowchart and a time chart, respectively, of the mechanics intializing operation of step a4 (see FIG. 35) for states other than the ejection/insertion state. The operation starts at step c1. At step c2, the stocker 13 is elevated to the upper limit by normally rotating the stocker motor 32. When it is detected that the stocker 13 has reached the upper limit from an output of the stocker position sensor 114 at step c3, the PU unit 15 is advanced to the clamping position by normally rotating the insertion/ejection motor 130 at step c4. At step c5, advancement to the clamping position is detected by a fact that the clamping position SW 203 turns on. Next, at step c6, the PU unit 15 is withdrawn and returned to the play position by reversely rotating the insertion/ejection motor 130. At step c7, return to the play position is detected by the play position sensor 204. At step c8, the stocker 13 is lowered by reversely rotating the stocker motor 32. At step c9, a lowered position of the stocker 13 is detected from an output of the stocker position sensor 114. After the stocker 13 is lowered, at step c10 the PU unit 15 is advanced by normally rotating the insertion/ejection motor 130 and a CD 14 mounted on the turn table 27 is inserted into the stocker 13.

When the clamping position SW 203 turns on at step c11, the insertion/ejection motor 130 is stopped. After a lapse of a predetermined time t1, at step c12 the CD 14 is extracted from the central shaft 191 side of the turn table 27 by normally rotating the stocker motor 32 and the clamping is canceled. If it is Judged at step c13 that the stocker 13 has elevated to a predetermined position from an output of the stocker position sensor 114, at step c14 a unit ejecting operation is performed in which the PU unit 15 is withdrawn to the origin of the rack 16. When return to the origin is detected by the unit origin SW 206 at step c15, at step c16 an operation of returning the stocker 13 to the origin is performed by reversely rotating the stocker motor 32. When return to the origin is detected from an output of the stocker position sensor 114 at step c17, at step c18 an operation of returning the rack 16 to the origin is performed by reversely rotating the stairs motor 31. At step c19, the stair origin SW 89 turns on, and the return of the rack 16 to the origin is completed when the portion of the stairs sliding member 35 where the slits 39 are formed goes out of the count sensor 123. After being temporarily stopped for the time t1, reverse rotation of the stairs motor 31 is restarted at step c20. During the course of this operation, the rack that meshes with the pinion 210 is changed from the stairs rack 40 of the stairs sliding member 35 to the lock rack 46 of the lock sliding member 45. When the lock position SW 90 turns off at step c21, the operation is finished at step c22.

Figure 40:
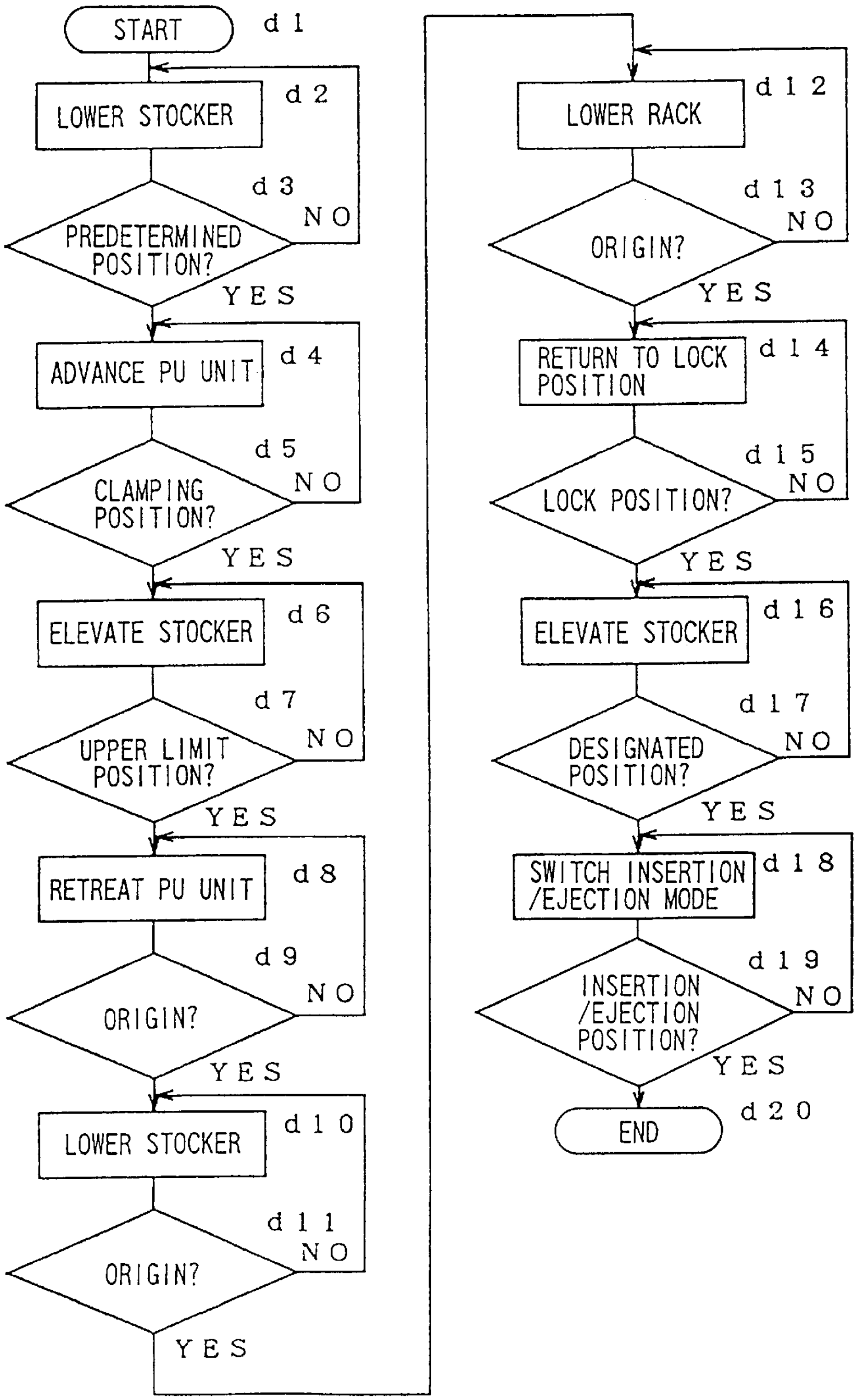
FIGS. 40 and 41 are a flowchart and a time chart, respectively, showing an operation performed by the electrical configuration of FIG. 34.
Figure 41:
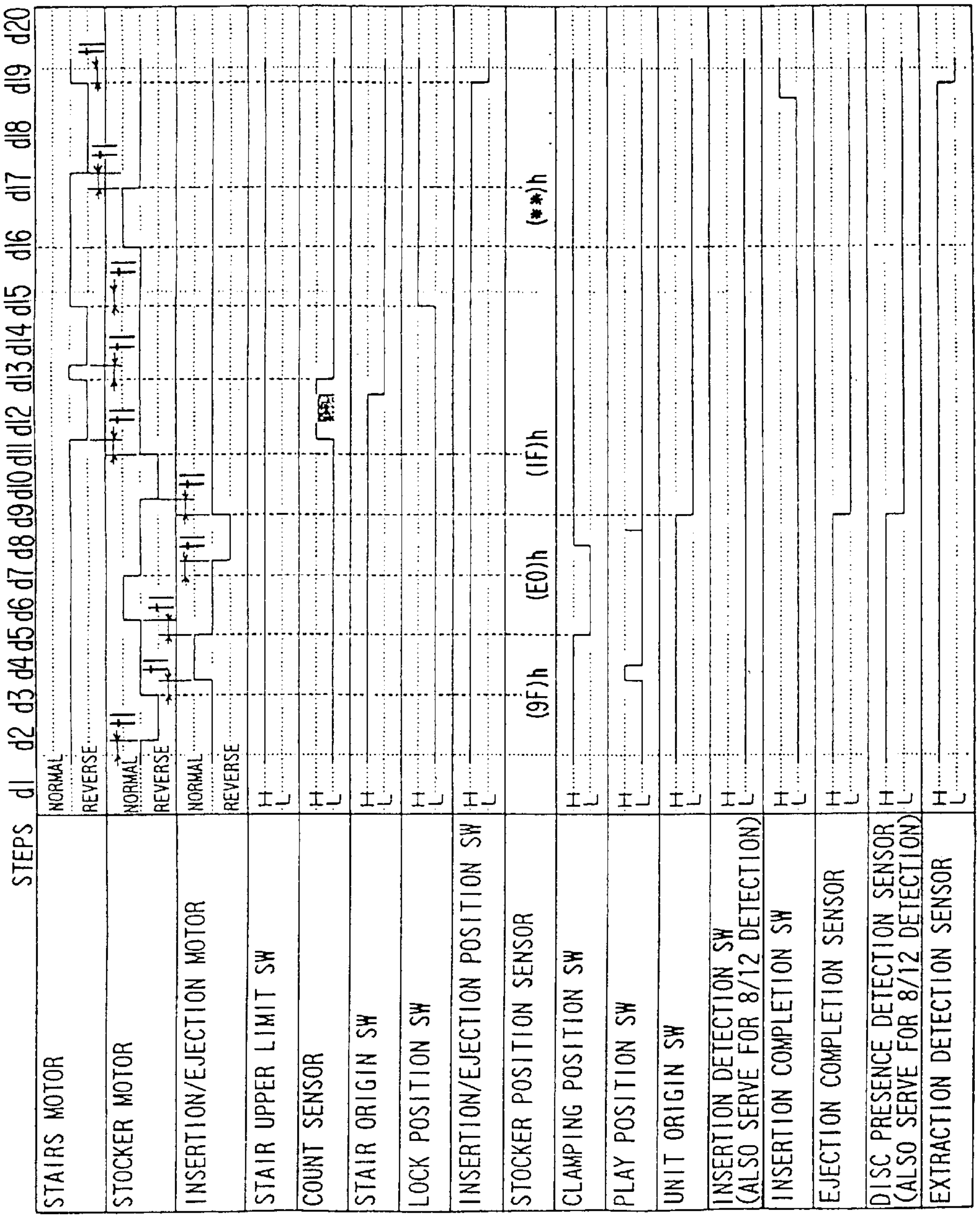

FIGS. 40 and 41 are a flowchart and a time chart, respectively, of the CD insertion preparing operation of step a8 shown in FIG. 35. The operation starts at step d1. At step d2, the stocker 13 is lowered by reversely rotating the stocker motor 32. If at step d3 it is judged from an output of the stocker position sensor 114 that a lowered position of the stocker 13 has reached a predetermined position, the stocker motor 32 is stopped. After a lapse of a predetermined time t1, at step d4 the PU unit 15 is advanced into the stocker 13 by normally rotating the insertion/ejection motor 130. When the clamping position SW 203 turns on at step d5, the insertion/ejection motor 130 is stopped. After a lapse of the predetermined time t1, at step d6 the stocker 13 is elevated by normally rotating the stocker motor 32 and the clamping is canceled, i.e., a CD 14 is extracted from the central shaft 191.

When at step d7 it is detected from an output of the stocker position sensor 114 that the stocker 13 has elevated to a predetermined position, at step d8 a unit ejecting operation for withdrawing the PU unit 15 from the stocker 13 is performed by reversely rotating the motor 130. When the unit origin SW 206 turns on at step d9, the insertion/ejection motor 130 is stopped. After a lapse of the predetermined time t1, at step d10 the stocker 13 is returned to the origin by reversely rotating the stocker motor 32. When an output of the stocker position sensor 114 reaches a predetermined value at step d11, the stocker motor 32 is stopped. After a lapse of the predetermined time t1, at step d12 the rack 16 is returned to the origin by reversely rotating the stairs motor 31. After the stair origin SW 89 turns on at step d13, at step d14 a lock position returning operation is performed in which the rack that meshes with the pinion 210 is changed from the stairs rack 40 of the stairs sliding member 35 to the lock rack 46 of the lock sliding member 45. The lock position returning operation is finished and the stairs motor 31 is stopped when the lock position SW 90 turns off at step d15. At step d16, the stocker 13 is elevated by normally rotating the stocker motor 32. If at step d17 it is judged from an output of the stocker position sensor 114 that the stocker 13 has reached a predetermined position, the stocker motor 32 is stopped. After a lapse of the predetermined time t1, at step d18 an insertion/ejection mode switching operation is performed by reversely rotating the stairs motor 31. When the insertion/ejection position SW 91 turns on at step d19, the operation is finished at step d20.

Figure 42:
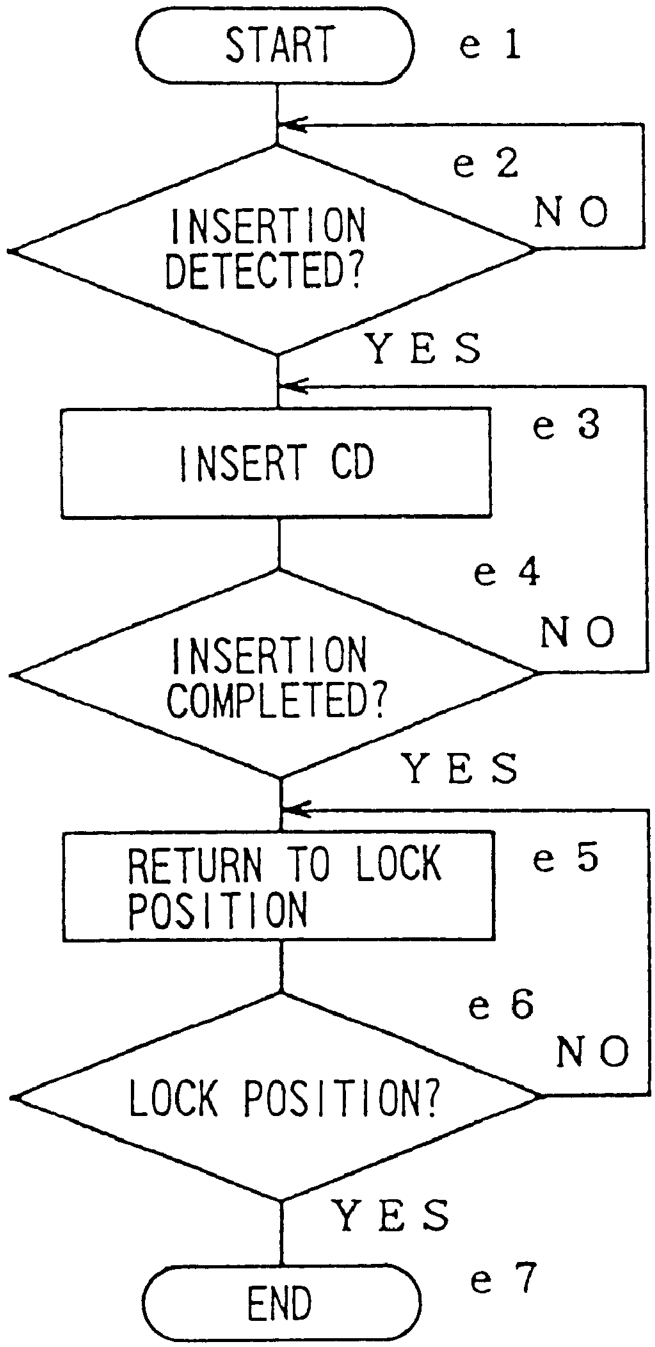
FIGS. 42 and 43 are a flowchart and a time chart, respectively, showing an operation performed by the electrical configuration of FIG. 34.
Figure 43:
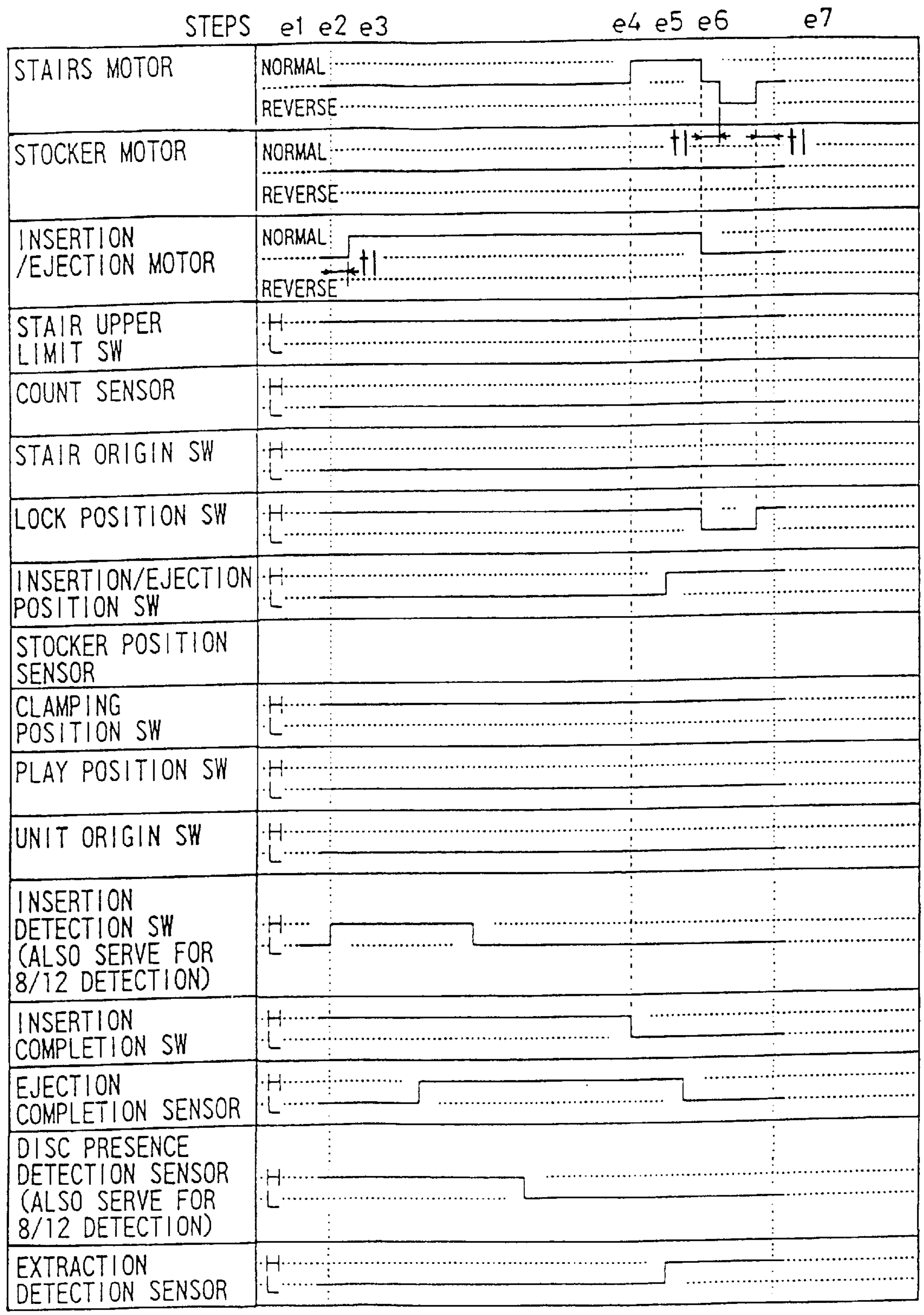

FIGS. 42 and 43 are a flowchart and a time chart of the CD inserting operation of step a9 shown in FIG. 35. The operation starts at step e1. At step e2, the insertion detection SW 182 turns off (high level) and insertion of a 12-cm CD 14 is thereby detected. After a lapse of a predetermined time t1, at step e3 a disc inserting operation is started by normally rotating the insertion/ejection motor 130. An inserted CD 14 is moved rearward, the output of the ejection completion sensor 201 turns to a high level, the insertion detection SW 182 turns on (low level), and the output of the disc presence detection sensor 202 turns from a high level to a low level. When the insertion completion SW 124 turns on at step e4 as a result of insertion of the CD 14 into the stocker 13, at step e5 an operation of returning from the insertion/ejection position to the lock position is started by normally rotating the stairs motor 31. When the lock position SW 90 turns on at step e6, the insertion/ejection motor 130 is stopped. The stairs motor 31 is also stopped for the time t1 and then reversely rotated. The stairs motor 31 is again stopped at a position where the lock position switch 90 turns off. The CD inserting operation is finished at step e7.

Figure 44:
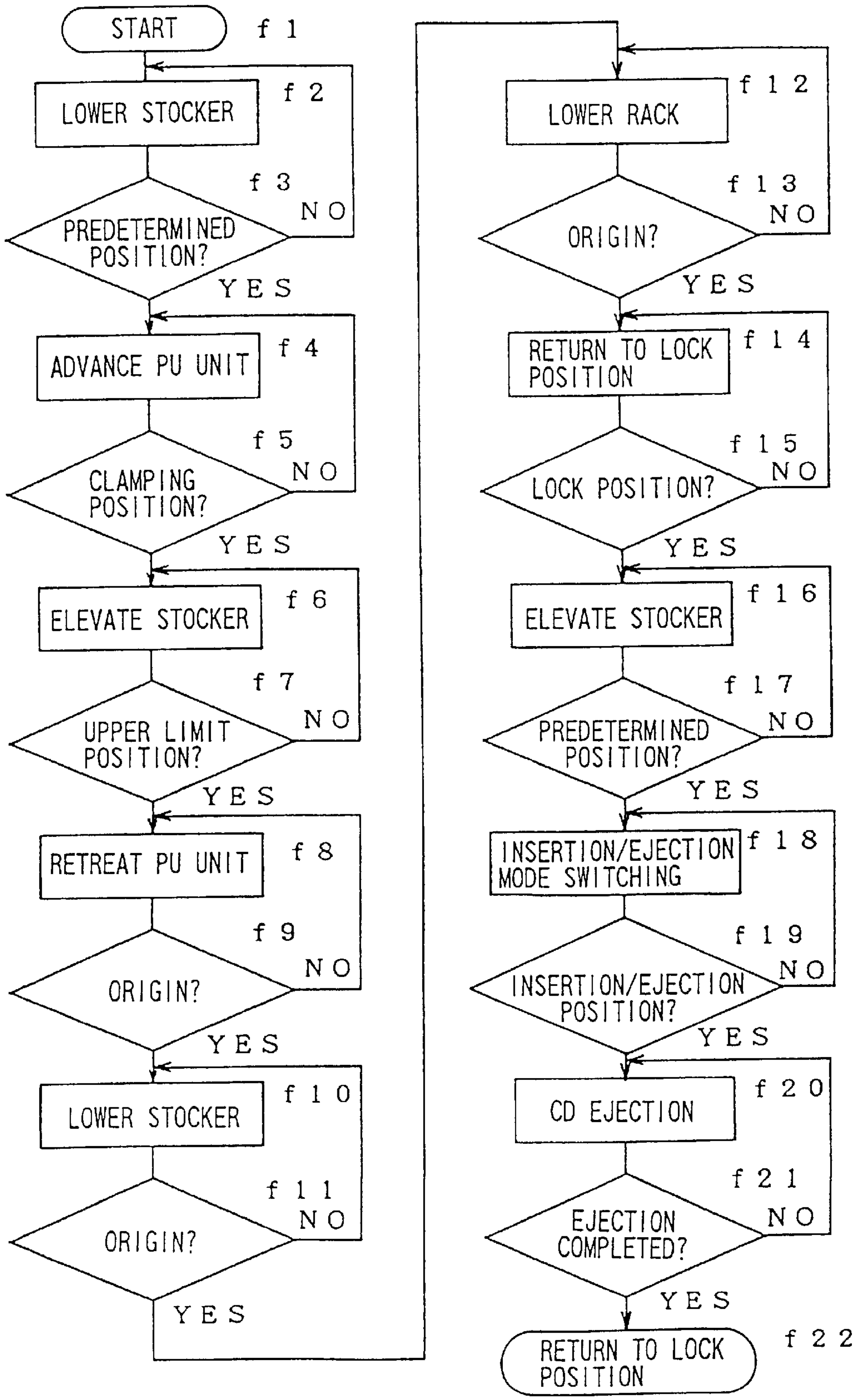
FIGS. 44 and 45 are a flowchart and a time chart, respectively, showing an operation performed by the electrical configuration of FIG. 34.
Figure 45:
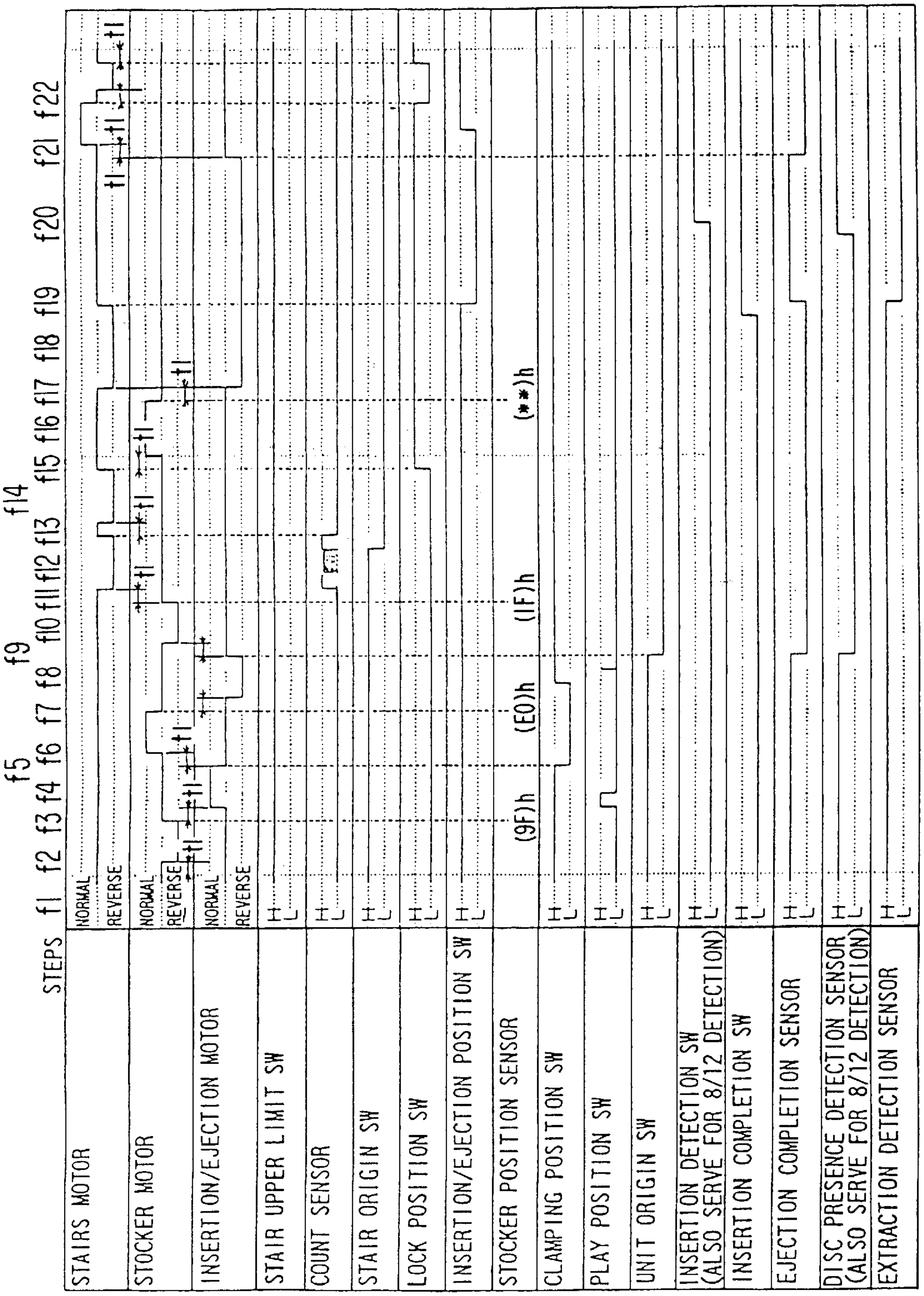

FIGS. 44 and 45 are a flowchart and a time chart, respectively, of the CD ejecting operation of step all shown in FIG. 35. The operation starts at step f1. At step f2, the stocker 13 is lowered by reversely rotating the stocker motor 32. If at step f3 it is Judged from an output of the stocker position sensor 114 that the stocker 13 has lowered to a predetermined position, the stocker motor 32 is stopped. After a lapse of a predetermined time t1, at step f4 the PU unit 15 is advanced into the stocker 13 by normally rotating the insertion/ejection motor 130 to effect disc returning. When the clamping position SW 203 turns on at step f5, the insertion/ejection motor 130 is stopped. After a lapse of the predetermined time t1, at step f6 the stocker 13 is elevated by normally rotating the stocker motor 32 to A perform a clamping canceling operation. If at step f7 it is judged from an output of the stocker position sensor 114 that the stocker 13 has reached a predetermined height, at step f8 a unit ejecting operation for withdrawing the PU unit 15 from the stocker 13 is performed by reversely rotating the insertion/ejection motor 130 after a lapse of the predetermined time t1. When the unit origin SW 206 turns on at step f9, the insertion/ejection motor 130 is stopped. At step f10, the stocker 13 is lowered to return it to the origin by reversely rotating the stocker motor 32 after a lapse of the predetermined time t1. If at step f11 it is judged from an output of the stocker position sensor 114 that the stocker 13 has lowered to a predetermined position, the stocker motor 32 is stopped. At step f12, the stairs motor 31 is reversely rotated after a lapse of the predetermined time t1. At step f13, it is detected that the rack 16 has reached the origin. After a temporary stop for rack switching, the lock sliding member 45 is further moved at step f14. Return to the lock position is detected at step f15.

At step f16, the stocker 13 is elevated by normally rotating the stocker motor 32. At step f17, it is judged from an output of the stocker position sensor 114 that the stocker 13 has elevated to a predetermined position. When the stocker 13 is elevated to the predetermined position, at step f18 a disc ejecting operation for ejecting a CD 14 is performed by reversely rotating the stairs motor 31 and the insertion/ejection motor 130. When the insertion/ejection position SW 91 turns on at step f19, at step f20 the stairs motor 31 is stopped but the insertion/ejection motor 130 continues to be rotated reversely to continue a CD ejecting operation. When at step f21 the output of the ejection completion sensor 201 turns to a low level which means detection of the CD 14, the insertion/ejection motor 130 is stopped. After a lapse of the predetermined time t1, at step f22 a lock position returning operation is performed in which the stairs motor 31 is normally rotated and, after the lock position SW 90 temporarily turns on, the stairs motor 31 is reversely rotated.

Figure 46:
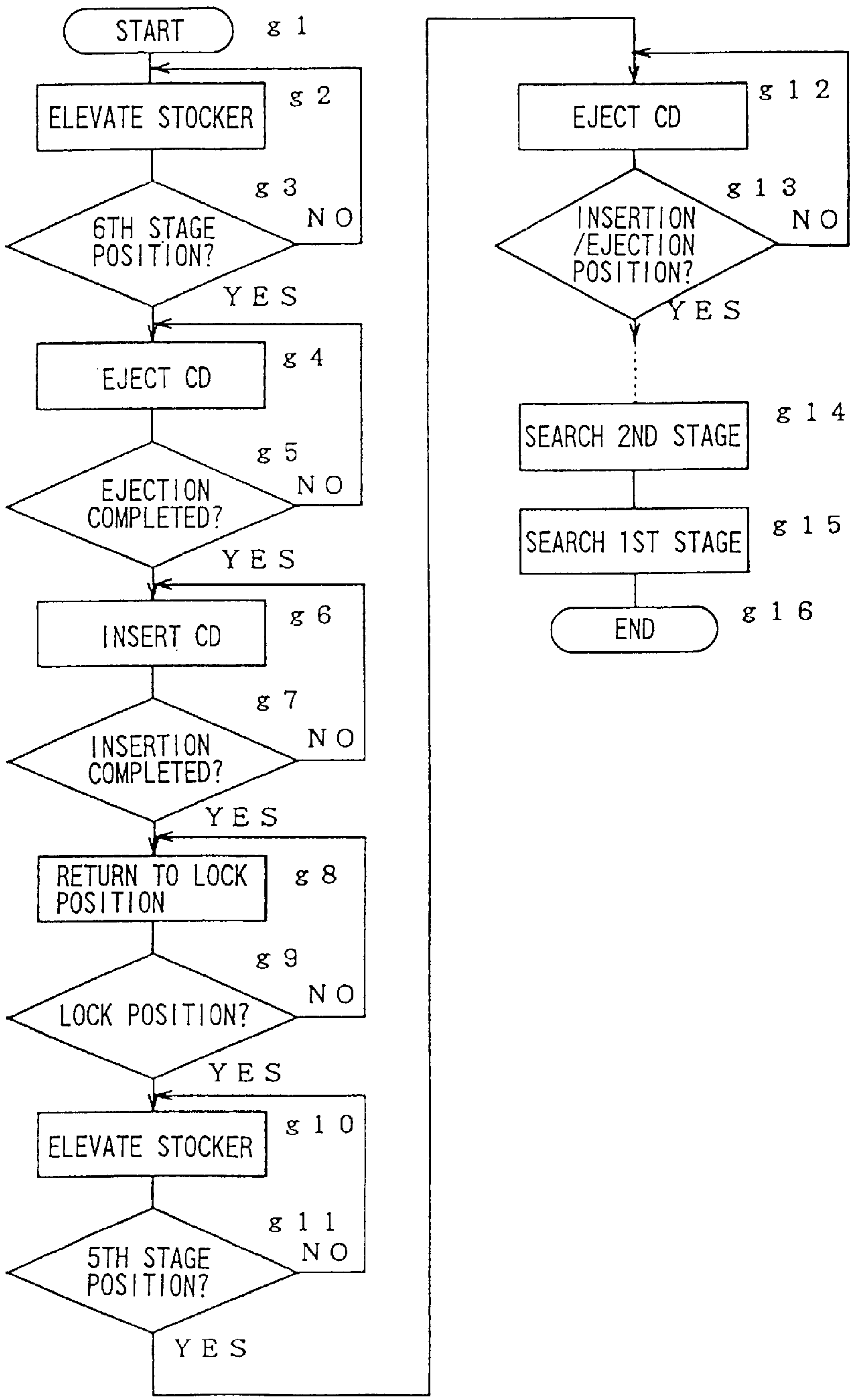
FIGS. 46 and 47 are a flowchart and a time chart, respectively, showing an operation performed by the electrical configuration of FIG. 34.
Figure 47:
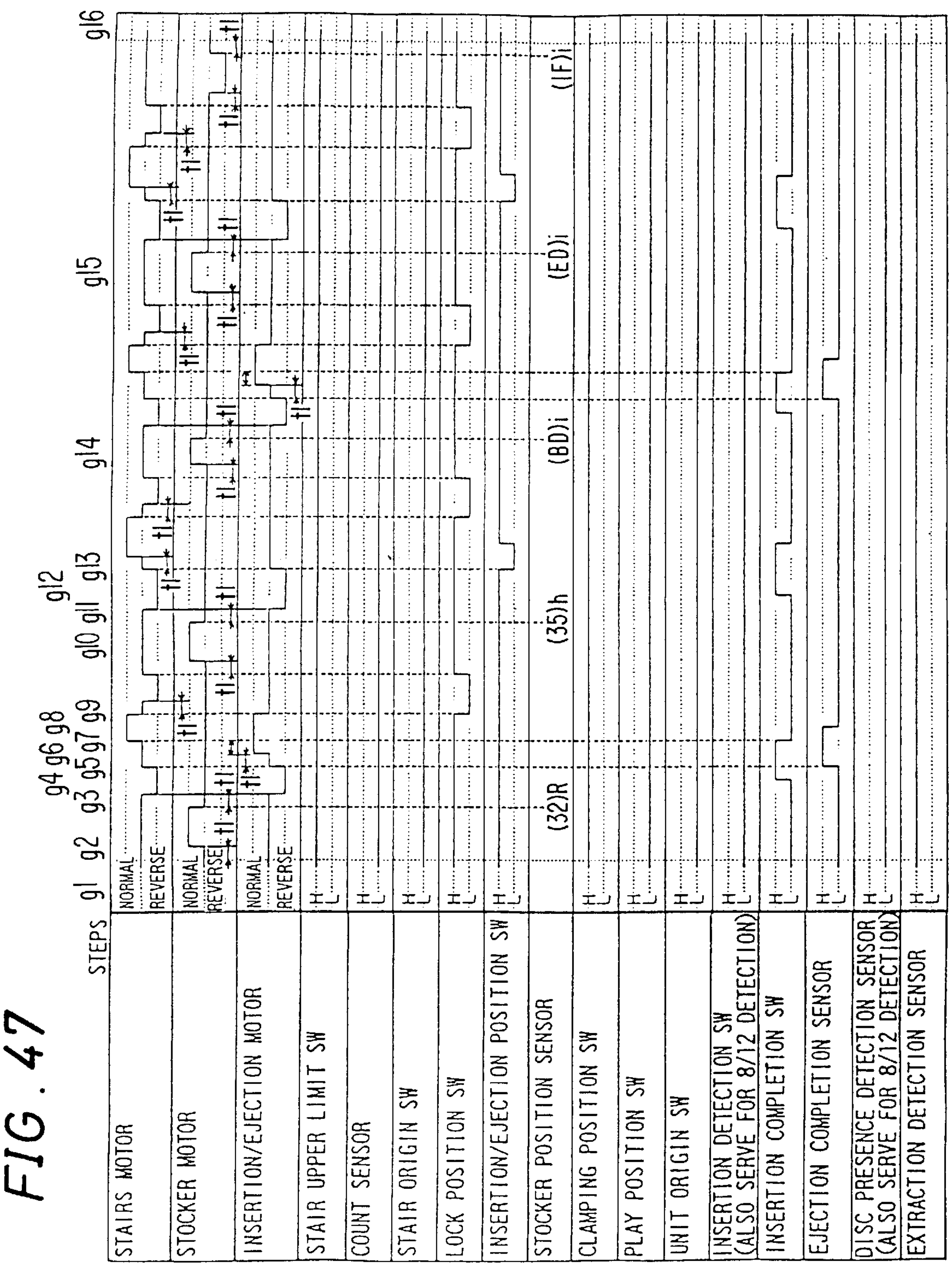

FIGS. 46 and 47 are a flowchart and a time chart, respectively, of the CD search operation of step a12 shown in FIG. 35. The operation starts at step g1. At step g2, the stocker 13 is elevated by normally rotating the stocker motor 32. If at step g3 it is judged from an output of the stocker position sensor 114 that the stocker 13 has elevated to the sixth stage position, the stocker motor 32 is stopped. After a lapse of a predetermined time t1, a CD ejecting operation is performed at step g4, where both of the stairs motor 31 and the insertion/ejection motor 130 are rotated reversely. It is assumed that a CD 14 is housed in the sixth stage.

When at step g5 the CD 14 is ejected to the position of the ejection completion sensor 201 by the push-out lever 72, the ejection completion sensor 201 is turned off because light that should be received by the ejection completion sensor 201 is interrupted. At step g6, a disc inserting operation for pushing in a CD 14 by means of the push-in lever 140 is performed by normally rotating the stairs motor 31 and the insertion/ejection motor 130. Pushing in the CD 14 is continued until the insertion completion SW 124 turns on at step g7. The stairs motor 31 is reversely rotated at step g8. At step g9, the lock position SW 90 temporarily turns from an off-state to an on-state and the stairs motor 31 is stopped at a position where the lock position SW 90 again turns to an on-state. At step g10, after a lapse of the predetermined time t1, the stocker 13 is elevated by normally rotating the stocker motor 32. At step g11, it is judged from an output of the stocker position sensor 114 that the stocker 13 has been elevated to the fifth stage position. At step g12, after a lapse of the predetermined time t1, a disc ejecting operation is performed by reversely rotating both of the stairs motor 31 and the insertion/ejection motor 130. It is assumed that no CD 14 is housed in the fifth stage.

At step g13, it is judged that the rack 16 has reached the insertion/ejection position from a fact that the insertion/ejection position SW 91 has turned on, and the stairs motor 31 and the insertion/ejection motor 130 are temporarily stopped. In the same manner as in the above, it is judged at step g14 whether a CD 14 is held in the second stage stocker member, and it is judged at step g15 whether a CD 14 is held in the first stage stocker member. The operation is finished at step g16.

Figure 48:
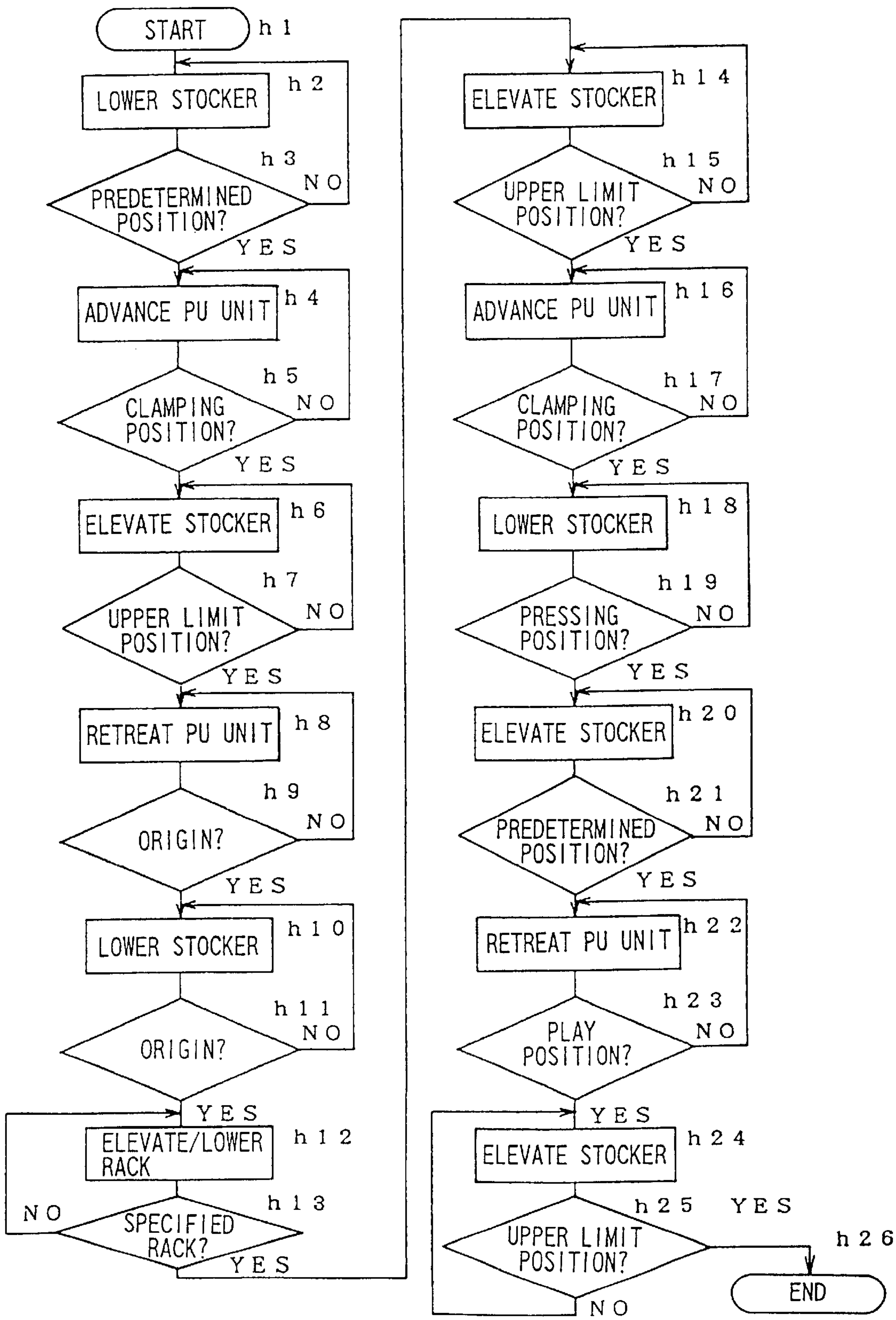
FIGS. 48 and 49 are a flowchart and a time chart, respectively, showing an operation performed by the electrical configuration of FIG. 34.
Figure 49:
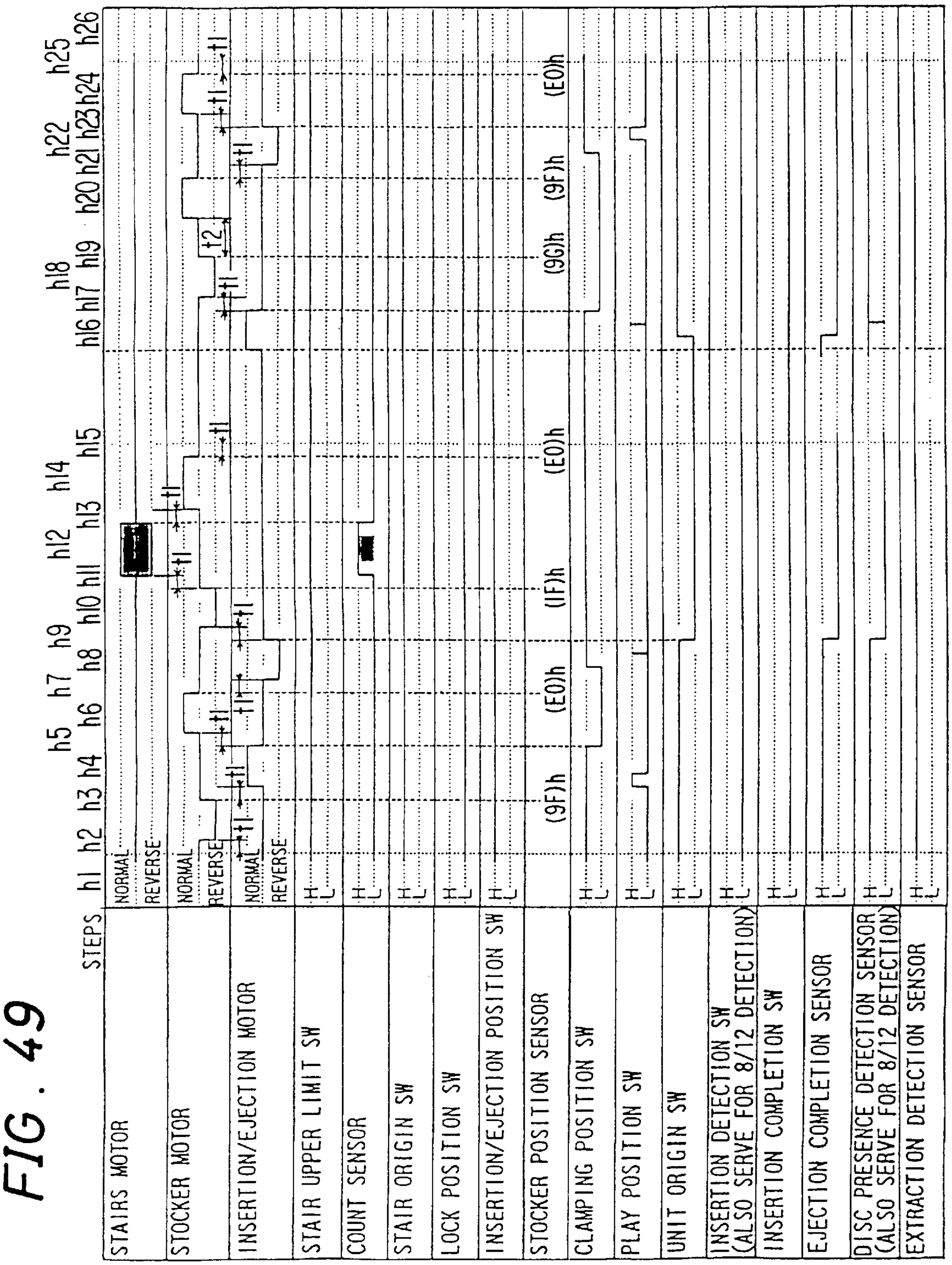
Figure 50:
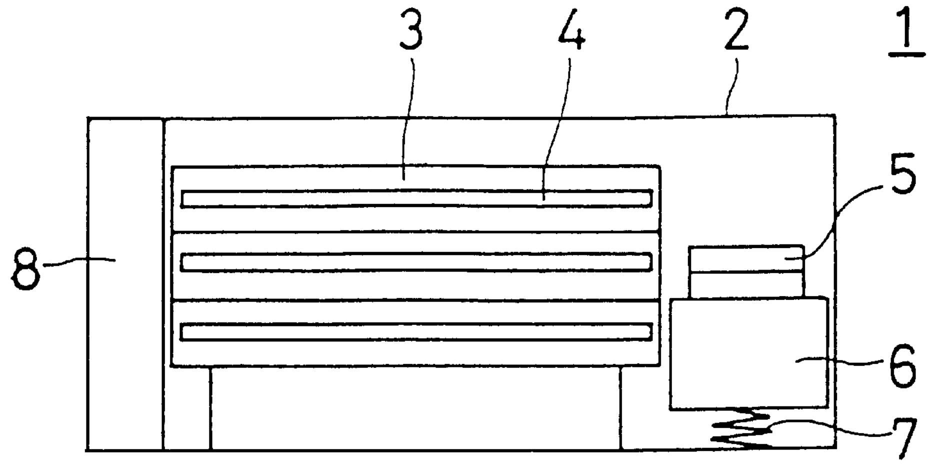
FIGS. 50A and 50B are front and top sectional views, respectively, showing a general configuration of a conventional autochanger.
Figure 50:
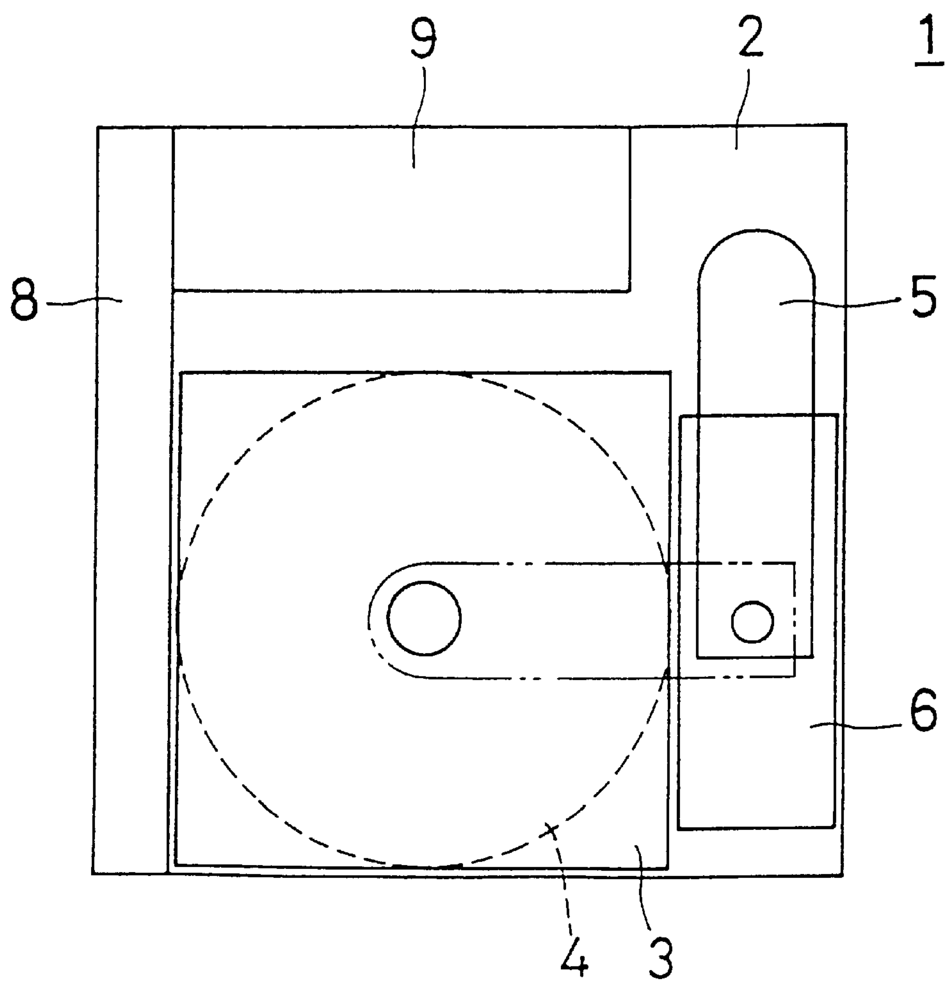

FIGS. 48 and 49 are a flowchart and a time chart, respectively, of the CD detecting operation of step a14 shown in FIG. 35. The operation starts at step h1. At step h2, the stocker 13 is lowered by reversely rotating the stocker motor 32. If at step h3 it is judged from an output of the stocker position sensor 114 that the stocker 13 has lowered to a predetermined position, the stocker motor 32 is stopped. At step h4, after a lapse of a predetermined time ti, a CD 14 mounted on the PU unit 15 is returned to the stocker 13 by normally rotating the insertion/ejection motor 130. When the clamping position SW 203 turns on at step h5, the insertion/ejection motor 130 is stopped. At step h6, after a lapse of the predetermined time t1, a clamping canceling operation for extracting the CD 14 from the central shaft 191 is performed by normally rotating the stocker motor 32. If at step h7 it is judged from an output of the stocker position sensor 114 that the stocker 13 has reached the upper limit position, the stocker motor 32 is stopped. At step h8, after a lapse of the predetermined time t1, the PU unit 15 is withdrawn from the stocker 13 (unit ejection) by reversely rotating the insertion/ejection motor 130. When the unit origin SW 206 turns on at step h9, the insertion/ejection motor 130 is stopped. At step h10, after a lapse of the predetermined time t1, the entire stocker 13 is lowered (return to the origin) by reversely rotating the stocker motor 32. If at step h11 it is judged from an output of the stocker position sensor 114 that the stocked 13 has been lowered to the origin, at step h12 the stairs motor 31 is rotated after a lapse of the predetermined time t1. At step h13, the rack 16 is stopped at a predetermined position based on an output of the count sensor 232.

At step h14, after a lapse of the predetermined time t1, an upper part of the stocker 13 is separated and elevated by normally rotating the stocker motor 32. At step h15, it is detected from an output of the stocker position sensor 114 that the upper part of the stocker 13 has been elevated to the upper limit position.

At step h16, the PU unit 15 is advanced into the stocker by normally rotating the insertion/ejection motor 130. When the clamping position SW 203 turns on at step h17, the insertion/ejection motor 130 is stopped. At step h18, after a lapse of the predetermined time t1, the stocker motor 32 is reversely rotated. If at step h19 it is judged from an output of the stocker position sensor 114 that the stocker 13 has been lowered to the pressing position, the stocker motor 32 is stopped. At step h20, after a lapse of a predetermined time t2, the upper part of the stocker 13 is again elevated by normally rotating the stocker motor 32. An elevated position is judged at step h21 from an output of the stocker position sensor 114. At step h22, after a lapse of the predetermined time t1, the PU unit 15 is withdrawn by reversely rotating the insertion/ejection motor 130 to extract from the stocker 13 a CD 14 that has been transferred to the PU unit 15. If at step h23 it is judged from an output of the play position sensor 204 that the PU unit 15 has reached the play position, the insertion/ejection motor is stopped. Then, at step h24, after a lapse of the predetermined time t1, the stocker 13 is further elevated by normally rotating the stocker motor 32. If it is judged at step h25 that the stocker 13 has elevated to a stocker escape position, the operation is finished at step h26.

In the above-described operations, for example, the predetermined times t1 and t2 are 100 msec and 500 msec, respectively. In the above embodiment, each of the stocker members 100 and the uppermost stocker member 101 has the front-side portion which has approximately the same shape as a CD 14. Therefore, an inserted CD 14, whose tip is directed upward due to the positional deviation between the top roller 25 and the bottom roller 26, can be guided smoothly. If a CD 14 is caused to be inserted approximately horizontally by, for instance, increasing the number of transport rollers 24, the front-side portion of each of the stocker members 100 and the uppermost stocker member 101 may be omitted. As for the disc-shaped recording carrier, naturally the invention can be applied to the CD-ROM for use in personal computers in the same manner as well as the CD 14. The invention can also be applied to the laser disc (LD), the mini disc (MD), and the like in the same manner. Further, the invention can also be applied to an apparatus in which a recording carrier is directly inserted/ejected for reproduction or recording without using the stocker 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A recording carrier reproduction/recording apparatus comprising:

an enclosure having an opening formed in a first wall;

a reproduction/recording means including a head mechanism for performing reproduction/recording of a recording carrier inserted in the opening of said enclosure, and a driving mechanism for moving the recording carrier to said reproduction/recording means:

spring means for supporting said reproduction/recording means in a floating state within said enclosure; and lock means for locking said reproduction/recording means in a fixed state from the floating state, said locking means including a first pressing member projecting from said reproduction/recording means at a side thereof which is opposite relative to the enclosure opening such that, upon actuation of said lock means to permit insertion or election of a recording carrier through the enclosure opening, said first pressing member moves into engagement with a second wall of said enclosure such that said reproduction/recording means is pressed against the first wall of said enclosure around the enclosure opening in the fixed state.

2. The recording carrier reproduction/recording apparatus of claim 1, further comprising shutter means for opening and closing the enclosure opening in accordance with movement of said lock means so as to permit insertion or ejection of a recording carrier through the enclosure opening after cancellation of the floating state by said lock means.

3. The recording carrier reproduction/recording apparatus of claim 1, wherein said lock means includes a second pressing member which projects from said reproduction/recording means in a transverse direction relative to an insertion or ejection direction of the recording carrier upon actuation of said lock means to permit insertion or election of a recording carrier.

4. The recording carrier reproduction/recording apparatus of claim 3, wherein said lock means includes a cam means for causing each of said first and second pressing members to move to projected positions.

5. The recording carrier reproduction/recording apparatus of claim 1, further comprising a rod-like member projecting sideways from said reproduction/recording means so as to be insertable into a groove formed in a wall of the enclosure, said rod-like member having a tip end, a proximal end, and a minimum-diameter portion located between said tip end and said proximal end, wherein said minimum-diameter portion of said rod-like member can be guided by a portion of the groove when said rod-like member is moved with said reproduction/recording means for insertion or ejection of a recording carrier.

6. The recording carrier reproduction/recording apparatus of claim 5, wherein said rod-like member moves in accordance with movement of said lock means to insert or eject a recording carrier.

7. A recording carrier reproduction/recording apparatus comprising:

an enclosure having an opening formed in a first wall, wherein a recording carrier can be inserted or ejected individually through the opening;

a mechanical deck including housing means for housing a plurality of recording carriers;

reproduction/recording means for performing reproduction and/or recording of the plurality of recording carriers;

spring means for supporting said mechanical deck within said enclosure in a floating state; and lock means for locking said mechanical deck in a fixed state by pressing said mechanical deck against the first wall of said enclosure around the opening so as to cancel the floating state in order to permit insertion or ejection of one of the recording carriers, said lock means including a first pressing member projecting from said mechanical deck at a side which is opposite relative to the enclosure opening in order to engage a second wall of said enclosure.

8. The recording carrier reproduction/recording apparatus of claim 7, further comprising shutter means for opening and closing said enclosure opening in accordance with movement of said lock means so as to permit insertion or ejection of a recording carrier through said enclosure opening after cancellation of the floating state by said lock means.

9. The recording carrier reproduction/recording apparatus of claim 7, wherein said lock means includes a second pressing member projecting from said mechanical deck in a transverse direction relative to an insertion or ejection direction of the recording carrier when a recording carrier is inserted or ejected.

10. The recording carrier reproduction/recording apparatus of claim 9, wherein said lock means includes a cam means for causing said first and second pressing members to move to projected positions.

11. The recording carrier reproduction/recording apparatus of claim 9, further comprising:

a groove formed in a side wall of said enclosure;

a rod-like member projecting sideways from said mechanical deck and being inserted into said groove, said rod-like member having a tip end, a proximal end, and a minimum-diameter portion located between said tip end and said proximal end, wherein said groove has a width which varies along its length such that said minimum-diameter portion of said rod-like member is guided by said groove when said rod-like member is moved with said mechanical deck to insert or eject a recording carrier.

12. The recording carrier reproduction/recording apparatus of claim 11, wherein said rod-like member moves in accordance with movement of said lock means to insert or eject a recording carrier.

13. The recording carrier reproduction/recording apparatus of claim 12, further comprising:

moving means for selecting one of the plurality of recording carriers housed in said housing means and moving said selected recording carrier so that said selected recording carrier is subjected to reproduction or recording by said reproduction/recording means; and driving means for driving said moving means and said lock means.

* * * * *